US012539583B1

(12) United States Patent
Francis et al.

(10) Patent No.: US 12,539,583 B1
(45) Date of Patent: *Feb. 3, 2026

(54) SQUEEZING CLAMP HAMMER UNION TORQUE TOOL

(71) Applicant: TORQ/LITE, LLC, Luling, LA (US)

(72) Inventors: Dale Francis, Luling, LA (US); Nic Francis, Luling, LA (US); William P. Bernard, Luling, LA (US); Oswald J. Bernard, Luling, LA (US)

(73) Assignee: TORQ/LITE, LLC, Luling, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/901,777

(22) Filed: Sep. 30, 2024

Related U.S. Application Data

(63) Continuation of application No. 18/194,754, filed on Apr. 3, 2023, now Pat. No. 12,103,143, which is a continuation of application No. 17/521,208, filed on Nov. 8, 2021, now Pat. No. 11,618,137, which is a continuation of application No. 16/729,655, filed on Dec. 30, 2019, now Pat. No. 11,167,397, which is a continuation of application No. 15/715,571, filed on Sep. 26, 2017, now Pat. No. 10,518,393, which is a continuation of application No. 14/625,847, filed on Feb. 19, 2015, now Pat. No. 9,782,876.

(60) Provisional application No. 61/941,558, filed on Feb. 19, 2014.

(51) Int. Cl.
*B25B 21/00* (2006.01)
*E21B 19/16* (2006.01)

(52) U.S. Cl.
CPC .......... *B25B 21/005* (2013.01); *B25B 21/002* (2013.01); *E21B 19/163* (2013.01); *Y10T 29/49822* (2015.01); *Y10T 29/49881* (2015.01)

(58) Field of Classification Search
CPC ..... B25B 21/005; B25B 21/002; B25B 21/00; B25B 23/145; Y10T 29/49822; Y10T 29/49881; E21B 19/163
See application file for complete search history.

(56) References Cited

U.S. PATENT DOCUMENTS

| | | |
|---|---|---|
| 1,550,071 A | 8/1925 | Guiberson |
| 2,279,118 A | 4/1942 | Fortune et al. |
| 2,342,783 A | 2/1944 | Aron et al. |
| 2,560,263 A | 7/1951 | Wiegand et al. |
| 2,709,385 A | 5/1955 | Alger |
| 2,744,431 A | 5/1956 | Scime |

(Continued)

FOREIGN PATENT DOCUMENTS

| | | |
|---|---|---|
| RU | 2215862 C1 | 11/2003 |
| WO | WO2008012811 A2 | 1/2008 |
| WO | WO2010013014 A2 | 2/2010 |

*Primary Examiner* — Sarang Afzali
*Assistant Examiner* — Darrell C Ford
(74) *Attorney, Agent, or Firm* — Roy Kiesel Ford Doody & North, APLC; Brett A. North

(57) ABSTRACT

A uniquely designed torque wrench having a torque body, the torque body attached to a frictional squeezing clamp, and a lug socket which is rotationally connected to the frictional squeezing clamp. The frictional squeezing clamp entering a contracted stated during extension of a rod of a hydraulic cylinder, and entering an expanded state during the retraction of the rod of a hydraulic cylinder, the lug socket turning the wing nut of a hammer union.

20 Claims, 31 Drawing Sheets

(56) References Cited

U.S. PATENT DOCUMENTS

| | | | |
|---|---|---|---|
| 2,823,450 A | 2/1958 | Thomas | |
| 2,871,743 A | 2/1959 | Kelley | |
| 3,041,901 A | 7/1962 | Knights | |
| 3,272,038 A | 9/1966 | Burstall | |
| 3,380,323 A | 4/1968 | Campbell | |
| 3,799,010 A | 3/1974 | Guier | |
| 4,619,159 A | 10/1986 | Kurek | |
| 4,727,781 A | 3/1988 | Yuehui et al. | |
| 5,097,730 A | 3/1992 | Bernard et al. | |
| 5,791,206 A | 8/1998 | Daigle et al. | |
| 6,279,427 B1 | 8/2001 | Francis | |
| 6,938,520 B1 * | 9/2005 | Stuart | E21B 19/163 81/57.24 |
| 9,782,876 B2 * | 10/2017 | Francis | B25B 21/005 |
| 10,518,393 B2 * | 12/2019 | Francis | E21B 19/163 |
| 11,167,397 B1 * | 11/2021 | Francis | B25B 21/005 |
| 11,618,137 B1 * | 4/2023 | Francis | B25B 21/005 29/456 |
| 12,103,143 B1 * | 10/2024 | Francis | B25B 21/005 |
| 2009/0000397 A1 * | 1/2009 | Wagner | B25B 23/145 73/862.23 |
| 2009/0107298 A1 * | 4/2009 | Wagner | B25B 21/005 81/57.44 |
| 2011/0314972 A1 * | 12/2011 | Rickley, III | B25B 21/005 81/57.44 |
| 2012/0048069 A1 * | 3/2012 | Powell, Jr. | B25B 13/50 81/124.2 |
| 2013/0239754 A1 * | 9/2013 | Francis | B25B 13/5008 81/57.44 |
| 2016/0339563 A1 * | 11/2016 | Wilson | B25B 21/002 |

* cited by examiner

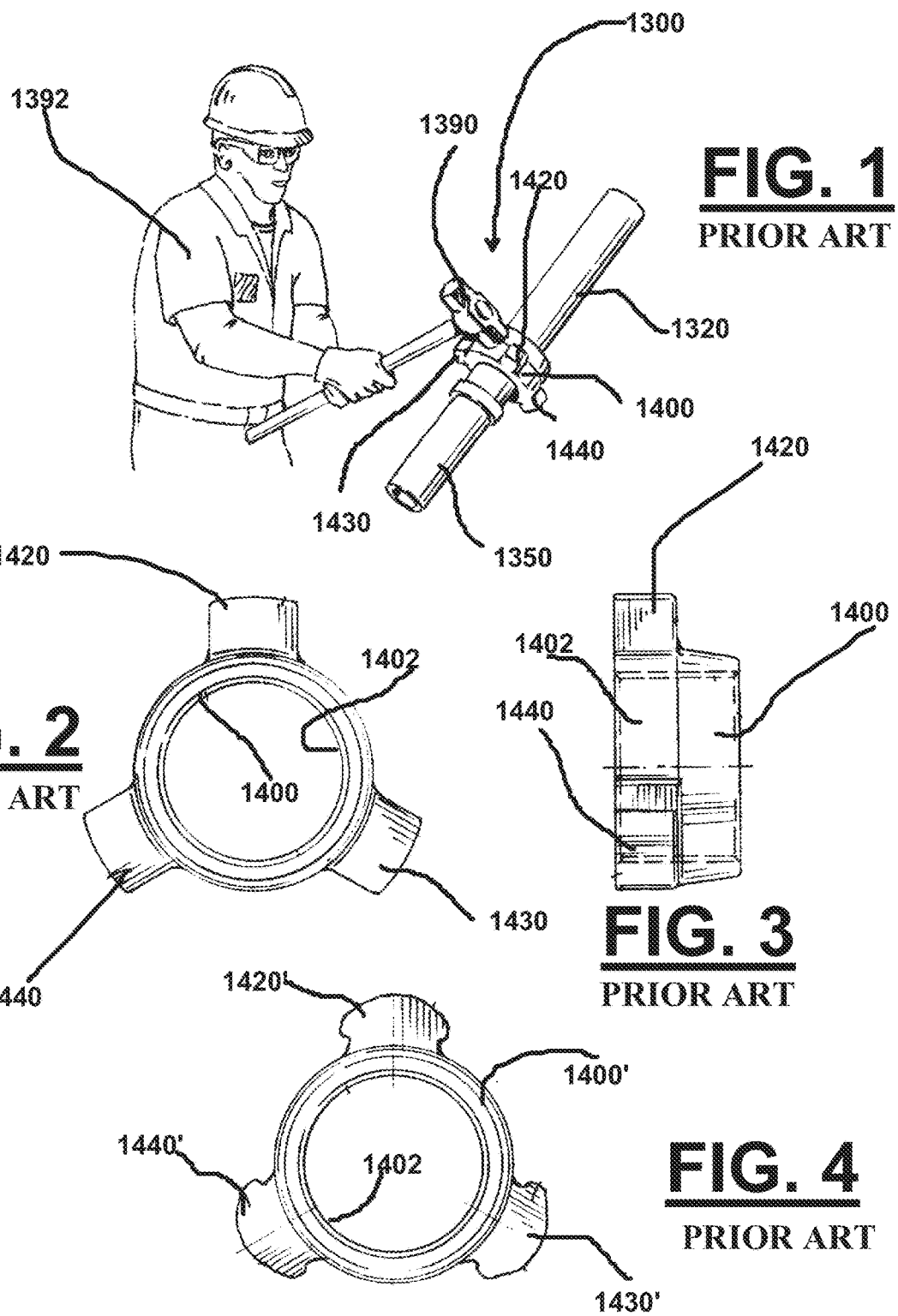

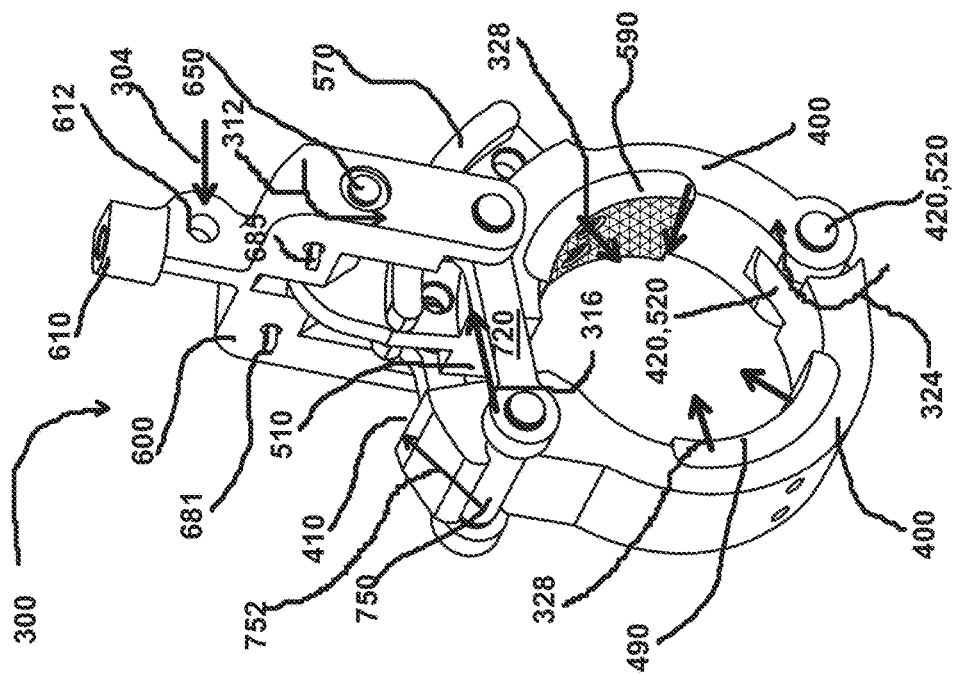
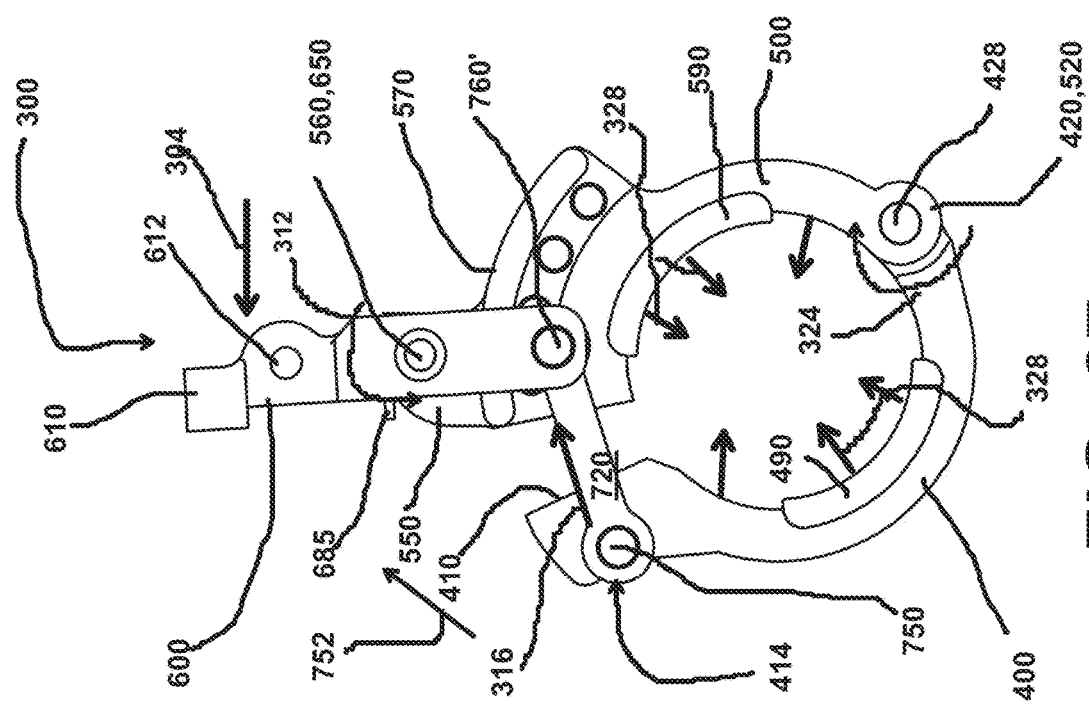

SQUEEZING CLAMP HAMMER UNION TORQUE TOOL

CROSS-REFERENCE TO RELATED APPLICATIONS

This is a continuation of U.S. patent application Ser. No. 18/194,754, filed Apr. 3, 2023 (issuing as U.S. Pat. No. 12,103,143 on Oct. 1, 2024), which is a continuation of U.S. patent application Ser. No. 17/521,208, filed Nov. 8, 2021 (now U.S. Pat. No. 11,618,137 on Apr. 4, 2023), which is a continuation of U.S. patent application Ser. No. 16/729,655, filed Dec. 30, 2019 (now U.S. Pat. No. 11,167,397), which is a continuation of U.S. patent application Ser. No. 15/715,571, filed Sep. 26, 2017 (now U.S. Pat. No. 10,518,393), which is a continuation of U.S. patent application Ser. No. 14/625,847, filed Feb. 19, 2015 (now U.S. Pat. No. 9,782,876), which claims the benefit of U.S. provisional patent application No. 61/941,558, filed on Feb. 19, 2014. Each of the above referenced applications/patents are incorporated herein by reference in their entirety and priority to/of which is hereby claimed.

BACKGROUND OF THE INVENTION

In one embodiment, the method and apparatus related to torque tools and hammer unions. More particularly, in one embodiment is provided a method and apparatus wherein a ratcheting hydraulic torque wrench having a frictional squeezing clamp and lug socket can be connected to a tubular member such that the lug socket receives a lug of a wing nut for a hammer union and causes the wing nut to be rotated thereby tightening and loosening hammer union connection as desired.

In the testing and production of hydrocarbon wells, specialized couplings are provided which incorporate seals to prevent leakage between the coupling components.

One such coupling is known as a union and comprises a coarse male thread on one of the components which cooperates with coarse female threads on a collar to provide a quick connect/disconnect coupling.

A more specialized quick connect/disconnect coupling is known as a hammer union which typically comprises four components:
 a thread end having coarse male threads on the exterior,
 a seal on the inside of the thread end,
 a nut end having a smooth nose abutting the seal and
 a hammer nut having coarse female threads on the interior and lugs or ears on the exterior which may be struck with a hammer to cinch up the coupling.

Typically, the wing nut component of the hammer union, which has a wing nut pipe segment with a threaded wing nut having integrated lugs, is tightened onto a male threaded pipe component by hammering upon the lugs. It is standard practice to capture the wing nut on the wing nut pipe segment which prevents users from removing or replacing the wing nut. Once captured, the wing nut and the wing nut pipe segment are generally inseparable.

Because hammer unions have the capability of being quickly connected and disconnected, they are widely used in temporary installations or in equipment which is expected to be disassembled periodically. In connection with the high-pressure flow transmission at a pipe joint a hammer union allows two coaxial threaded sections of pipe to be connected without rotating either of the pipe sections. Hammer unions allow pipeline couplings to be quickly and easily effected or released, and are effective under high-pressure conditions.

As such hammer unions are often used in flowline rigging when working pressure conditions can approach 15,000 psi. The nut of the hammer union is screwed onto the external thread, drawing the connecting pipe sections axially toward one another, and compressing a sealing ring to complete the proper connection.

Safety of a joined hammer union is a major concern because hammer unions are often used to connect piping carrying large volumes of fluid under high pressures. Due to the internal forces on the pipe joint, hammer union joints commonly fail in an explosive manner. A partially tightened or misaligned wing nut on a hammer union joint may hold pressure for a period of time, but may ultimately fail as the pressure pushes against the joint.

The current invention is directed to an apparatus for rotating a threaded device, and more specifically to an apparatus for rotating and thus tightening or loosening a wing union nut, such as a wing union nut utilized in connecting high pressure manifold equipment.

Space restraints and sometimes location often make the rotation of the threaded devices difficult. For example, wing union nuts utilized for high pressure manifold equipment are currently tightened using a hammer to hit the lugs on the wing union nut. It is difficult in confined spaces and/or in elevated locations such as a derrick to hammer the wing nut. Oftentimes, the hammer will glance off the lug or will miss the lug completely.

Such situations can be a safety hazard to the operator and may also cause damage to other equipment.

As identified herein, there is a need for a method and apparatus for automatically tightening and loosening a hammer union wing nut connection.

One prior art wrench is the type shown in U.S. Pat. No. 6,279,427 titled "Crosshead Jam Nut Torque Wrench, which is incorporated herein by reference, and discloses a gated drive head. However, such gated drive head does not provide a frictional driving force which varies directly with the amount of turning torque supplied by the wrench. Also incorporated herein by reference is U.S. Pat. No. 5,097,730.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

SUMMARY OF THE INVENTION

In one embodiment a torque wrench is provided with a frictionally squeezing clamp detachably connectable to a joint of pipe, the squeezing clamp having a gate with a quick connect/quick disconnect that can be opened allowing the frictionally squeezing clamp to be connected to a joint of pipe having a hammer union connection, the frictionally squeezing clamp being operatively connected to a selected lug socket which lug socket can be attached to one of the lugs on the wing nut of the hammer union.

After the drive frictional squeezing clamp is placed on a joint of pipe, a lug socket on the tool engages a selected lug of the hammer union, and after the frictional squeezing clamp is placed in a locked condition, causing the clamp to be rotational locked relative to the joint of pipe, the tool's drive mechanism is engaged causing the lug socket to rotate relative to the locked clamp, causing the selected lug and wing nut attached to the selected lug to rotate in a desired direction.

In one embodiment is provided torque wrench having a rotating lug socket and frictional clamp, the lug socket being rotationally connected to the frictional clamp head, with the frictional clamp having an expanding and contracting opening, for fitting over and clamping onto a tubular having a hammer union with a wing nut having a plurality of wing nut lugs, the hammer union joining two joints of tubing or pipe, wherein when the lug socket engages a specified lug of the wing nut and the frictional clamp engages one of the two joints of tubing, a relative rotation between the lug socket and frictional clamp causing the lug socket to rotate the wing nut of the hammer union relative to one or both of the joints, so that the hammer union can be selectively tightened or loosened.

In one embodiment the directional turning of the lug socket relative to the joint of pipe can be changed with opposite relative rotations achieved by turning around the frictional squeezing clamp.

In one embodiment a hydraulic cylinder is operatively connects the lug socket and the frictional squeezing clamp, along with powering the frictional squeezing clamp, so that under hydraulic pressure the lug socket is rotated relatively to the frictional squeezing clamp, while the frictional clamp is simultaneously caused to squeeze and frictionally lock relative to two joints of pipe, so that ultimately a hammer union connection between two joints of pipe can be selectively tightened or loosened. In one embodiment the frictional forces of the frictional squeezing clamp create sufficient frictional forces to resist relative rotation between the frictional squeezing clamp and the joints of pipe, allowing the relatively rotating lug socket to turn the wing nut of the hammer union ultimately causing the hammer union to be tightened or loosened. In this embodiment the hydraulic cylinder changes from a retracted to an extended state. In one embodiment the frictional forces create sufficient torsional forces to rotate the wing nut of the hammer union.

In one embodiment a hydraulic cylinder operatively connects the lug socket and the frictional squeezing clamp, along with powering the frictional squeezing clamp, so that under hydraulic pressure the frictional squeezing claim is caused to enter an unlocked frictional state relative to the joints of pipe while simultaneously causing the frictionally squeezing clamp to rotate relative to the lug socket, which lug socket is connected to a selected lug of a wing nut of a hammer union, so that the frictional squeezing clamp rotationally slides relative to the joints of pipe while the lug socket maintains a generally static position relative to the wing nut. In this embodiment the hydraulic cylinder changes from an extended to a retracted state. In one embodiment, in the unlocked state, the frictional forces between the sliding frictional squeezing clamp and the joints of pipe are less than the torsional forces causing rotation of the wing nut of the hammer union so that the wing nut remains rotationally static relative to the joints of pipe during retraction of the hydraulic cylinder.

In one embodiment the squeezing frictional clamp comprises first and second portions which are pivotally connected to each other at a first end, and a turning torque placed on the first portion tends to cause the first portion to rotate in a first direction, a torque is also placed on the second portion tending to cause the second portion to rotate in a second direction, the first and second directions being substantially opposite of each other.

In one embodiment the squeezing frictional squeezing clamp can be provided with a gate portion which can be disengaged and opened, to define a gate which can allow item to be tightened or loosened to be positioned inside the interior of the squeezing frictional clamp while the squeezing frictional clamp remains between the longitudinal ends of the item to be tightened or loosened. In one embodiment the squeezing frictional clamp can include a quick lock/quick unlock device to lock and unlock the gate portion of the frictional squeezing clamp.

In one embodiment is provided a method and apparatus for tightening or loosening a hammer union connection between joints of pipe including the use of a hammer union torque wrench having a frictional squeezing clamp having a gate portion, which clamp can be positioned over one of the joints of pipe with the gate portion of the frictional squeezing clamp placed in a squeezing state causing it to be rotationally locked relative to the joints of pipe and hammer union connection.

In one embodiment is provided a method and apparatus for tightening or loosening a wing nut having a plurality of lugs of a hammer union connection between two joints of pipe or tubing comprising the steps of:
(a) providing a fluid powered hammer union torque wrench including:
  (1) a frictional squeezing clamp having an opening with squeezing and relaxed states;
  (2) a lug socket rotationally connected to the clamp;
  (3) a fluid cylinder and rod operatively connecting both the lug socket and the clamp, the cylinder and rod having extension and retraction operations;
  (4) the extension and retraction of the rod relative to the cylinder respectively causing the clamp to enter the squeezing and contracting states,
(b) placing the clamp around one of the joints of pipe, attaching the lug socket to one of the lugs of the wing nut, and powering the fluid cylinder;
(c) wherein during rod extension:
  (1) the rod extension causing the clamp to enter into the squeezing state wherein the opening is reduced from a first size to a second size, the second size being smaller than the first size, the squeezing creating frictional forces between the clamp and the joint of pipe such that relative rotation between the clamp and joint of pipe is substantially prevented,
  (2) while relative rotation between the clamp and joint of pipe is substantially prevented, the rod extension also causing relative rotation between the lug socket and the clamp along with rotation of the wing nut; and
(d) after step "c", during retraction of the fluid cylinder:
  (1) the rod retraction causing the clamp to enter into a relaxed state wherein the opening is increased from the second size to the first size, the increase in size reducing frictional forces between the clamp and the joint of pipe to less than the frictional force required to rotate the wing nut, thereby allowing relative rotation between the clamp and joint of pipe while the wing nut remains substantially rotationally static,
  (2) while the wing nut remains substantially rotationally static, causing relative rotation between the lug socket and the clamp; and
(e) repeating steps "c" and "d" until the hammer union joint is selectively tightened or loosened.

In one embodiment, the frictional squeezing clamp, rotationally connected to the torque body, can comprise a four bar linkage mechanism comprising a fulcrum, link, first arcuate section, and second arcuate section wherein the first and second arcuate sections are pivotally connected to each other, the link is pivotally connected to the first arcuate section and fulcrum, and the fulcrum is pivotally connected to the second arcuate section. In one embodiment the fluid rod/cylinder can be pivotally connected to fulcrum and wrench body. In one embodiment extension of rod relative to cylinder will cause the frictional squeezing clamp to enter a contracting state and also cause rotation of lug socket to the clamp in a first direction. In one embodiment retraction of rod relative into the cylinder will cause the frictional squeezing clamp to enter an expanding state (causing relative expansion of the cross sectional size of the interior space of the clamp) and also cause rotation of the lug socket relative to the clamp in the second direction which is the opposite of the first direction, and also cause the related clamp to slide relative to item to the joint of pipe or tubing (i.e., not turn item during a retraction stroke of rod relative to cylinder).

In one embodiment such relative expansion of the interior space is limited/restricted to a maximum extent. In one embodiment during a retraction stroke, the maximum amount of relative expansion of the interior space during an expansion stroke in percent area (compared to the cross sectional area of interior space's 395 size during extension stroke of rod 1100) is about 1, 2, 3, 4, 5, 6, 7, 8, 9, 10, 12, 14, 15, 16, 18, 20, 22, 24, 25, 26, 28, 30, 32, 34, and 35 percent. In various embodiments the maximum amount of relative expansion is between about any two of the above specified relative percentages.

In one embodiment the cross sectional area of the interior of the frictional squeezing clamp can be defined by the area circumscribed by the interior portions of the first and second arcuate sections of the clamp. Because there may be a gap between the ends of the interior portions of first and second arcuate sections of the clamp (such as when in a relaxed or expanded state), the area circumscribed can be determined by extrapolating the end of the interior portion of the first arcuate section of the clamp onto the end of the interior portion of the second arcuate section of the clamp. Such extrapolation can be by a method of curve fitting such as using standard curve fitting (e.g., the best fit curve fit) considering the shape of the interior portion of the first arcuate section of the clamp and the shape of the interior portion of the second arcuate section of the clamp. Alternatively a straight line can be drawn between the ends of the interior portion of the first and second arcuate sections of the frictional squeezing clamp.

In one embodiment, during a retraction stroke of rod relative to cylinder, the four bar linkage mechanism of frictional squeezing clamp formed by lever fulcrum, link, first arcuate section, and second arcuate section will cause lever fulcrum to rotate relative to frictional squeezing clamp (and relative to second arcuate section) causing the interior space of the frictional squeezing clamp to enter an expanding state, and during extension of rod relative to cylinder, lever fulcrum will rotate in the opposite direction (compared to retraction of rod relative to cylinder) causing the frictional squeezing clamp to enter a contracted state. In one embodiment the maximum sweep (relative to the frictional squeezing clamp) of lever fulcrum during retraction and extension strokes of rod relative to cylinder in degrees about 1, 2, 3, 4, 5, 6, 7, 8, 9, 10, 12, 14, 15, 16, 18, 20, 22, 24, 25, 26, 28, 30, 32, 34, 35, 36, 37, 38, 39, 40, 42, 44, 45, 46, 48, 50, 52, 56, 58, and 60 degrees. In various embodiments the maximum amount of relative rotation of lever fulcrum 600 is between about any two of the above specified relative degree measurements.

In one embodiment during an extension stroke of rod relative to cylinder, the frictional squeezing clamp has a maximum extension stroke area of contact with item to be tightened or loosened, and during a retraction stroke of rod relative to cylinder, frictional squeezing clamp has a minimum retraction stroke area of contact with item 1300. In one embodiment the maximum extension stroke area of contact is greater than the minimum retraction stroke area of contact. In various embodiments the extension stroke maximum area of contract is at least 1.1, 1.2, 1.3, 1.4, 1.5, 1.75, 2, 2.25, 2.5, 2.75, 3, 4, 5, 10, 15, 20, 25, 30, 35, 40, 45, and 50 times the retraction stroke minimum area of contact. In various embodiments the ratio of these to areas is between any two of the above specified ratio measurements.

In one embodiment, during a retraction stroke of rod relative to cylinder, the four bar linkage mechanism of the frictional squeezing clamp (formed by fulcrum, link; first arcuate section, and second arcuate section) will enter an expanding state where rotation of first arcuate section relative to second arcuate section about pivot point occurs in the opposite direction of rotation of the frictional squeezing clamp during retraction. In one embodiment such relative expanding relative rotation between first arcuate section and second arcuate section is limited/restricted to a maximum extent. In one embodiment during a retraction stroke of rod relative to cylinder, the maximum amount of relative rotation between first arcuate section and second arcuate section in degrees is about 1, 2, 3, 4, 5, 6, 7, 8, 9, 10, 12, 14, 15, 16, 18, 20, 22, 24, 25, 26, 28, 30, 32, 34, 35, 36, 37, 38, 39, 40, 42, 44, 45, 46, 48, 50, 52, 56, 58, and 60 degrees. In various embodiments the maximum amount of relative rotation is between about any two of the above specified relative degree measurements. In one embodiment before reaching any maximum amount of relative rotation between first arcuate section and second arcuate section (with respect to the four bar link system), the increasing reaction forces arising from fulcrum lever attempting to expand first arcuate section relative to second arcuate section increase to such an extent that frictional forces between track and arcuate slot (along with possible frictional forces between first arcuate section and/or second arcuate section relative to item to be tightened or loosened) are overcome allowing the frictional squeezing clamp to rotate/ratchet back into an initial starting drive position to be ready for the next extension stroke of rod relative to cylinder.

In one embodiment is provided a method and apparatus for rotating a threaded tightening device of a hammer union including a frictional squeezing clamp and a lug socket rotatively connected to the frictional squeezing clamp, wherein which can tighten or loosen a threaded wing nut of a hammer union. Actuation of the rotating lug socket will cause the wing nut of a hammer union to rotate in a desired direction.

BRIEF DESCRIPTION OF DRAWINGS

For a further understanding of the nature, objects, and advantages of the present invention, reference should be had to the following detailed description, read in conjunction with the following drawings, wherein like reference numerals denote like elements and wherein:

FIG. 1 is a perspective view of a person using a hammer to tighten or loosening a hammer union using the prior art method hitting the hammer wing nut with a hammer.

FIG. 2 is a front view of a hammer wing nut.

FIG. 3 is a side view of the hammer wing nut of FIG. 2.

FIG. 4 is a front view of an alternative hammer wing nut with modified lugs.

FIGS. 25 through 33 schematically illustrate various steps in the process of tightening the hammer union connection.

DETAILED DESCRIPTION OF THE INVENTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 5:
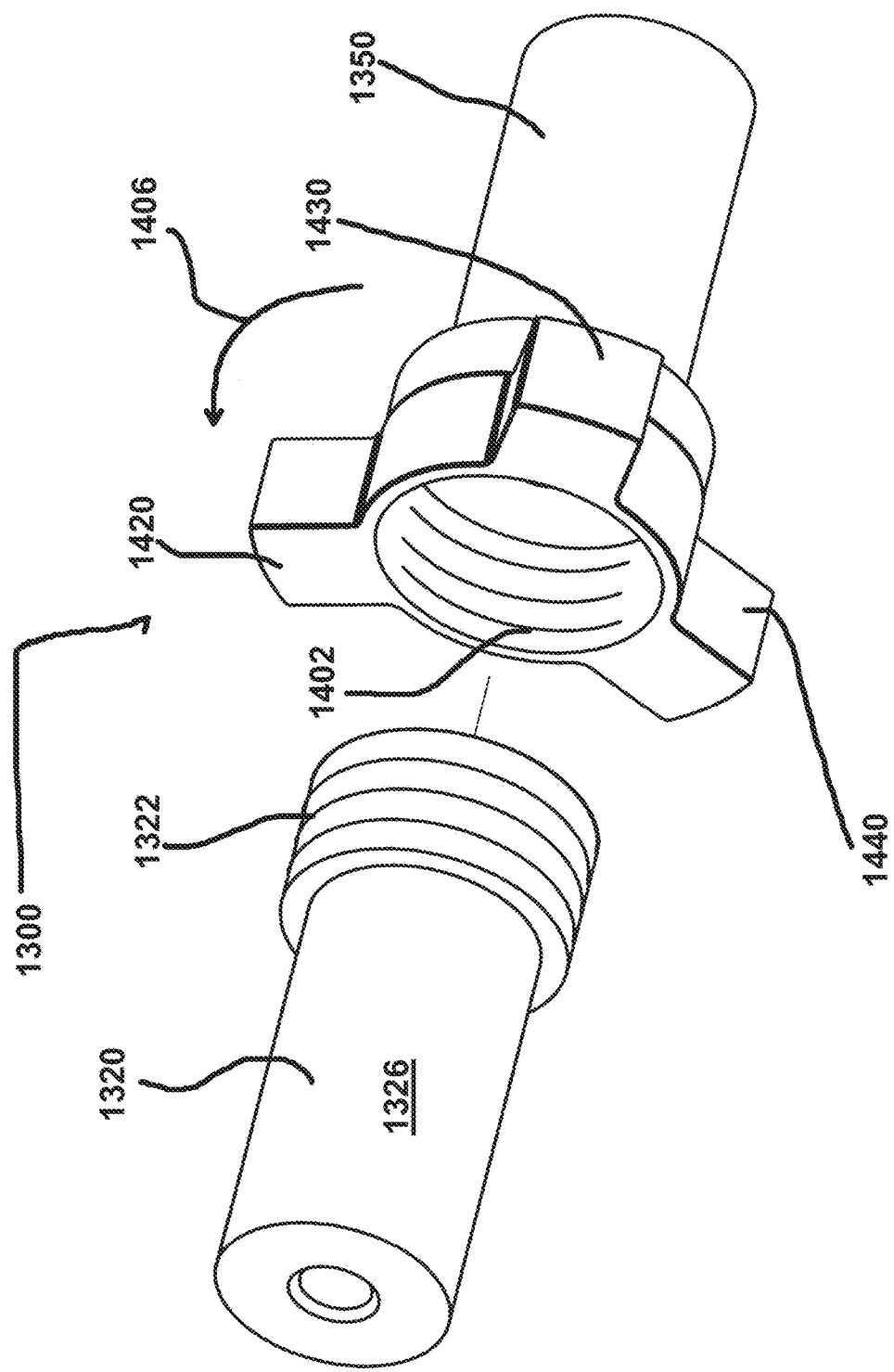
FIG. 5 is an exploded perspective view of two joints of tubulars having a hammer union type connection.
Figure 6:
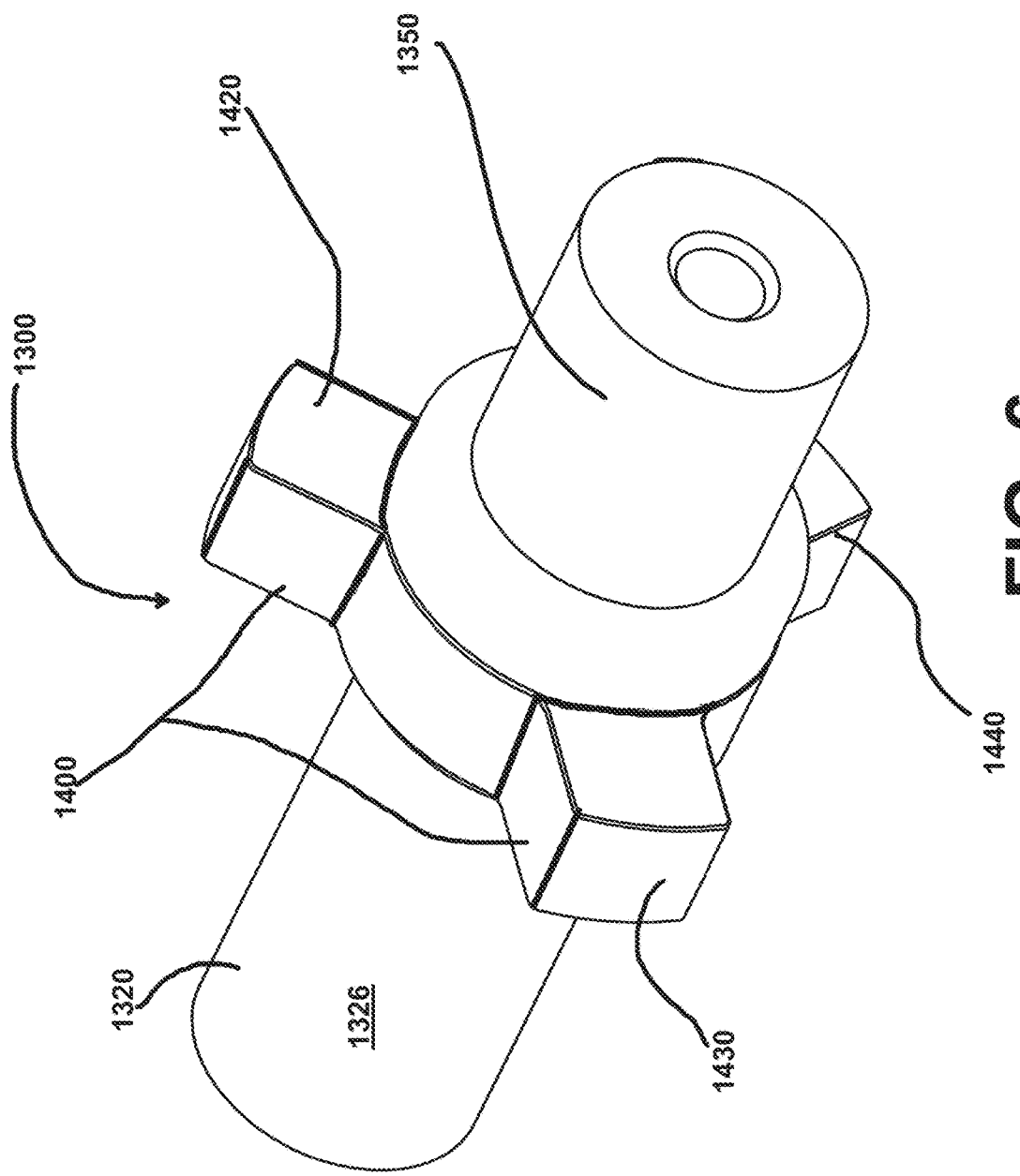
FIG. 6 is a perspective view of the two joints of tubulars of FIG. 1 with the two joints now ready to join with the hammer union connection.

FIG. 1 is a perspective view of a person 1392 using a hammer 1392 to tighten or loosening a hammer union connection between to joints of pipe 1320 and 1350 connecting together by a hammer wing nut 1400, using the prior art method hitting the hammer wing nut 1400 with a hammer 1392. FIG. 2 is a front view of the hammer wing nut 1400 taken from the end of pipe joint 1320. FIG. 3 is a side view of the hammer wing nut 1400. Hammer wing nut can include a plurality of lugs, for example lugs 1420, 1430, and 1440 and threaded section 1402. FIG. 4 is a front view of an alternative hammer wing nut 1400' with modified lugs 1420', 1430', and 1440'. FIG. 5 is an exploded perspective view of the two joints of tubulars 1320 and 1350 (of pipe 1300) having a hammer union type connection using hammer wing nut 1400. Joint 1320 includes threaded section 1322 which threadably connect to threaded section 1402 of hammer wing nut 1400. Hammer wing nut 1400 is rotatably connected to joint 1350 using conventional methods. FIG. 6 is a perspective view of the two joints 1320, 1350 of tubulars of pipe 1300 with the two joints now ready to join with the hammer union connection by tightening hammer wing nut 1400.

Generally, torque wrench tool comprises lug driving member 2000 which is operatively connected to frictional squeezing clamp 300. Torque wrench 10 can include a frictional squeezing clamp portion 300 with cooperating wrench body 100 having a first end 110 and a rear body portion on its second end 120. Body 100 can comprise first end 110, second end 120, and generally arcuate slot 130. Body 100 can be slidably connected to squeezing clamp portion 300 via cooperation between track 570 of second arcuate section 500, and arcuate slot 130 of body 100. Wrench body 100 can also include a hydraulic cylinder 1000 and piston rod 1100 for providing reciprocating motive force between body 100 and squeezing clamp portion 300 using fulcrum lever 600.

Fulcrum lever 600 can comprise first end 610, second end 620 with first and second prongs 624,628 spanning the second end 620. On first end can be pivot point/opening 612. On first and second prongs 624,628 can be pivot points/openings 625,628. Between opening 612 and openings 625, 629 can be pivot point/opening 640.

First arcuate section 400 can comprise first end 410 with pivot point/opening 414, second end 420 with pivot point/opening 424, and handle 450. Second arcuate section 500 can comprise first end 510, second end 520 with pivot point/opening 524, track 570, and arm 550 with pivot point/opening 560. Pivot point 424 can be pivotally connected to pivot point 524.

Figure 14:
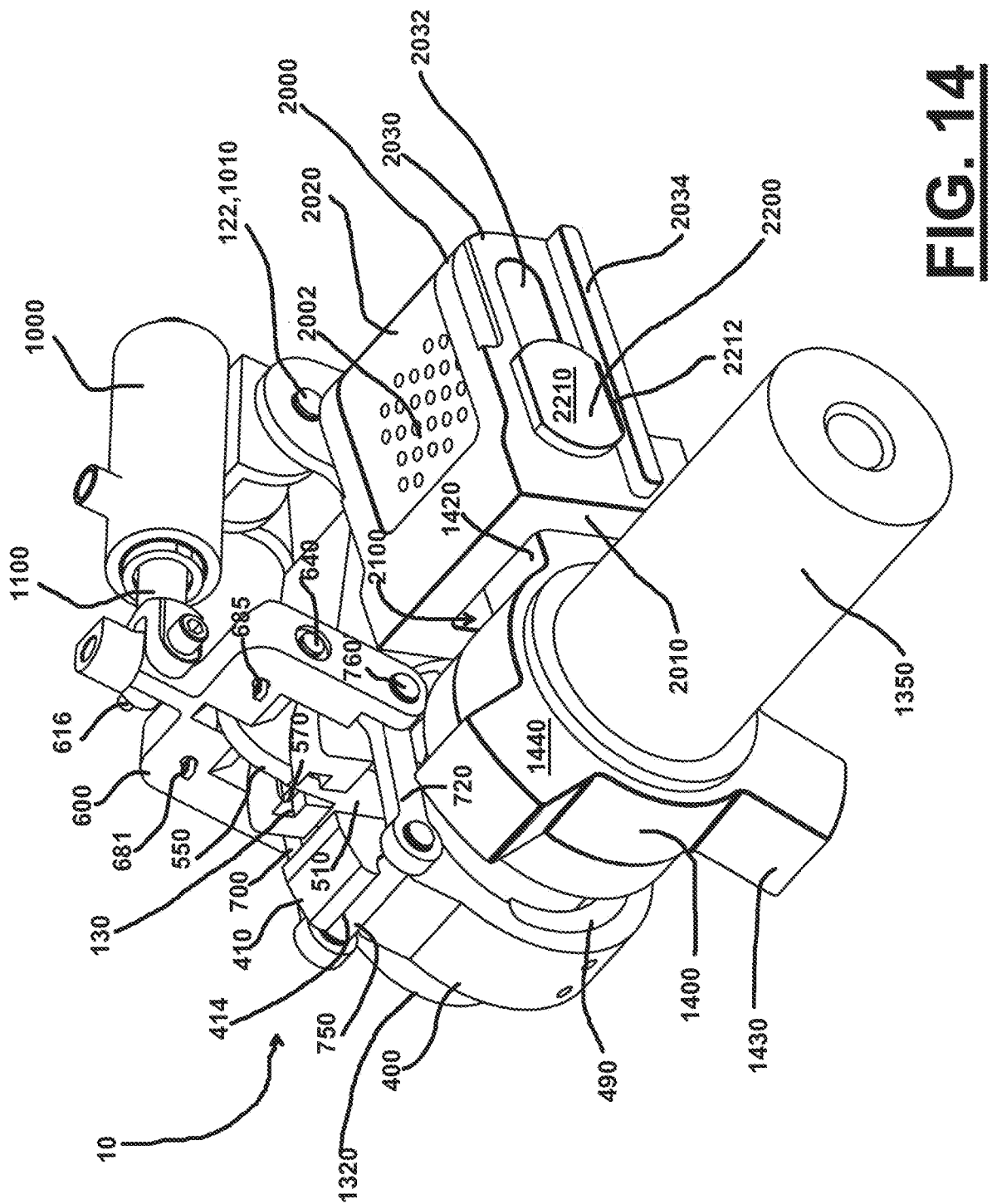
FIG. 14 is a perspective view of the tool of FIG. 13 with the lug socket fully slid over the selected lug.
Figure 15:
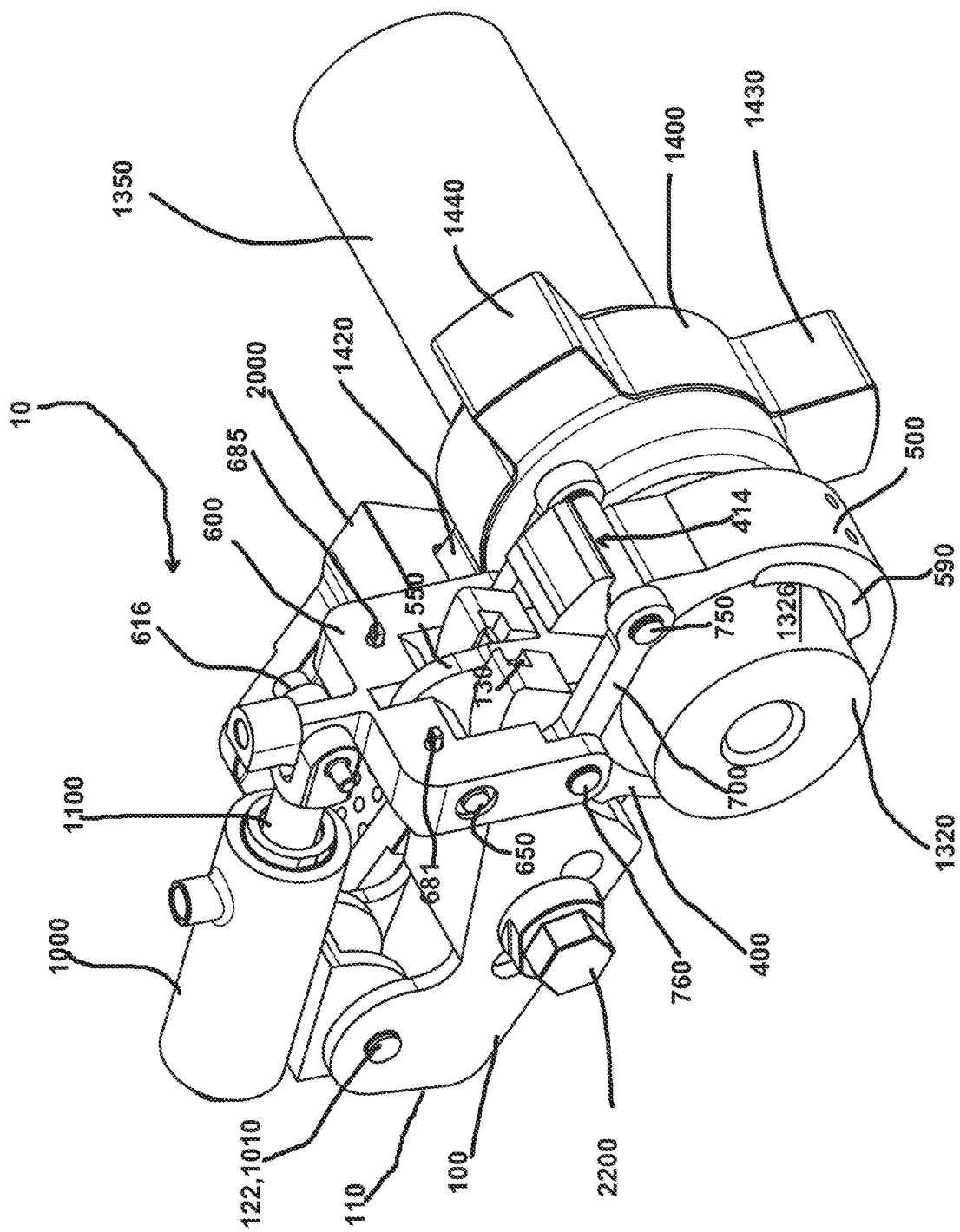
FIG. 15 is a perspective view of the tool of FIG. 14 (but taken from the opposite side of the tool as that shown in FIG. 14).
Figure 16:
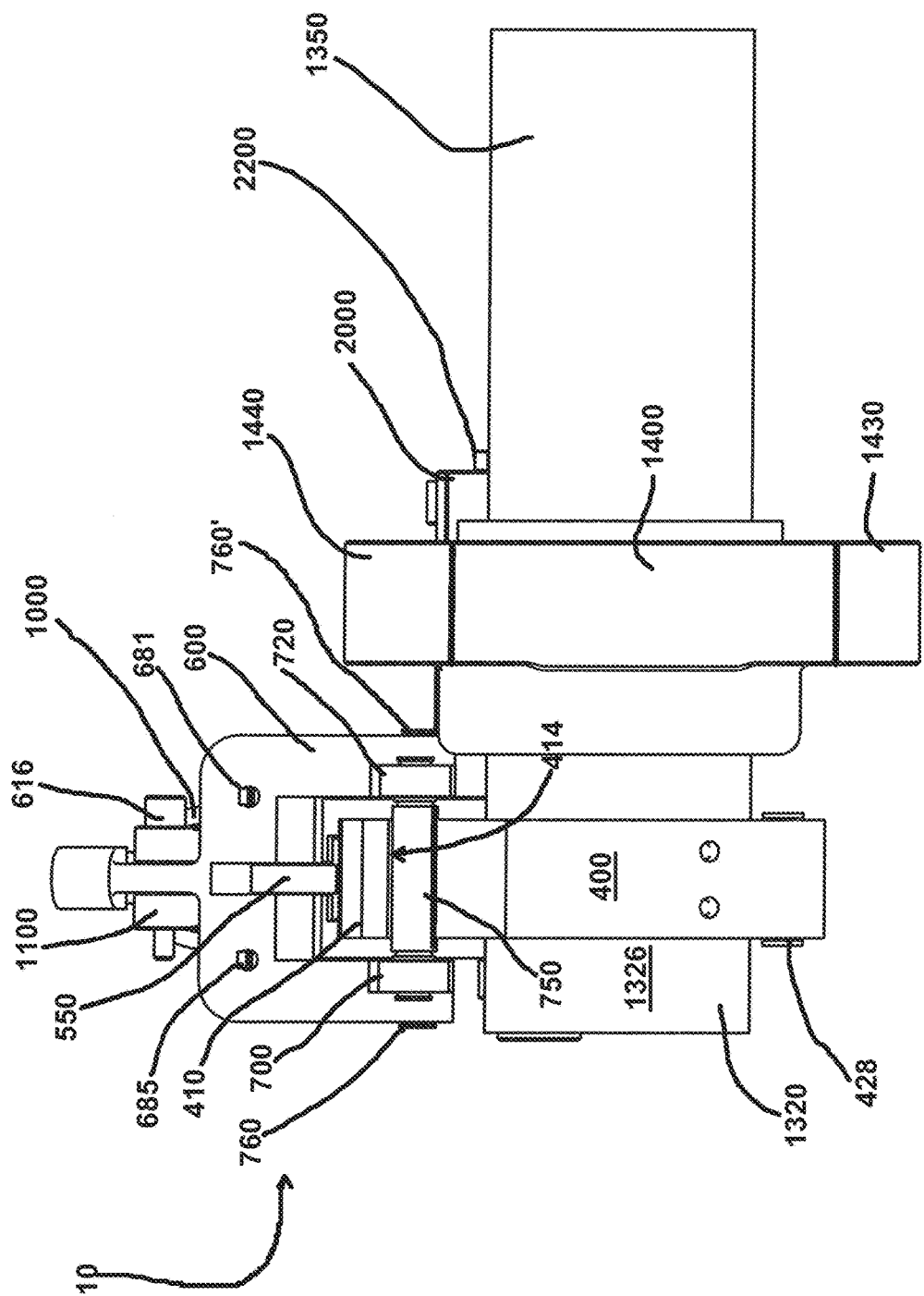
FIG. 16 is a front view of the tool of FIG. 14.
Figure 17:
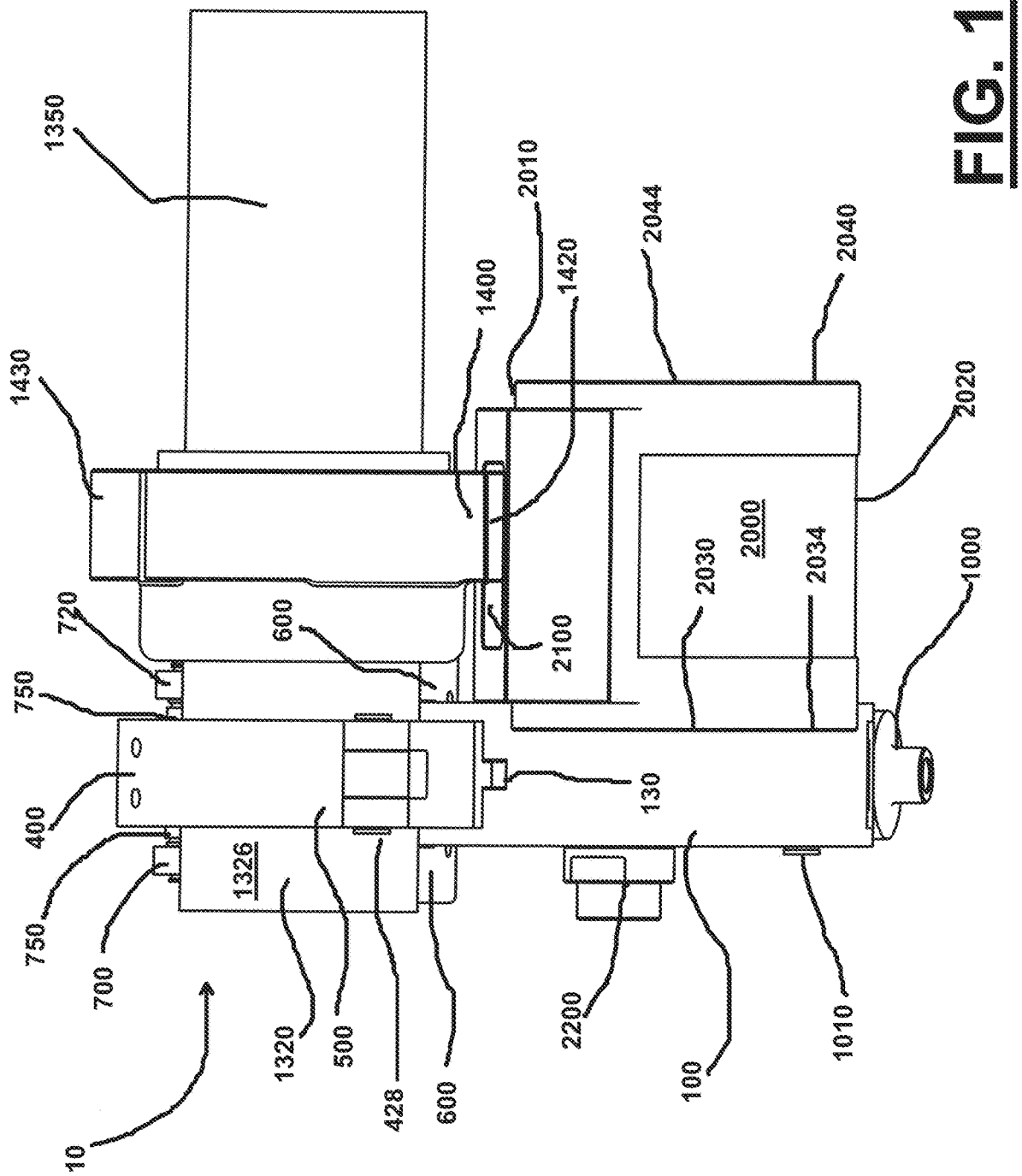
FIG. 17 is a bottom view of the tool of FIG. 14.
Figure 18:
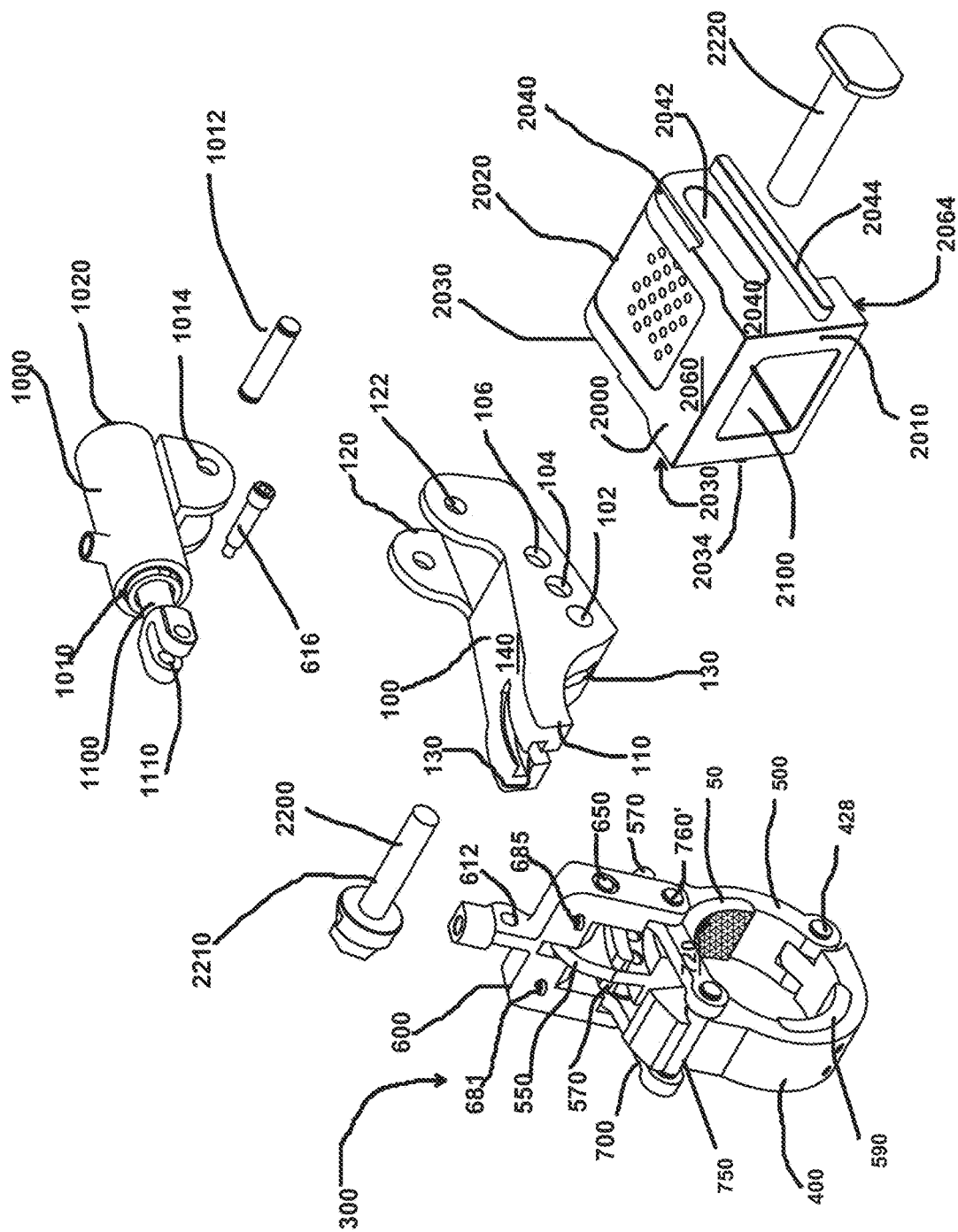
FIG. 18 is an exploded view of various components of the tool of FIG. 7.

FIGS. 14 and 15 are perspective views of clamp head 390 showing first 400 and second 500 sections along with the clamping/squeezing mechanism (lever 600 with links 700, 720) illustrated in a non-squeezing state, wherein the clamp assembly 390 is positioned to tighten a hammer wing nut 1400. FIGS. 27-31 are perspective views of clamp head 390 showing the first 400 and second 500 sections along with the clamping/squeezing mechanism shown in a squeezing state, positioned to tighten a hammer wing nut 1400.

Torque wrench tool 10 can include hydraulic cylinder 1000 which houses a piston internally on a rod 1100 with the hydraulic cylinder being 1000 fluidly powered with a pair of hydraulic lines (lines are not shown for clarity but a person of ordinary skill in the art would understand the operation of a hydraulic cylinder/piston arrangement) so that as hydraulic fluid is pumped into cylinder 1000 via a first line of the pair of hydraulic lines, the piston and rod 1100 is moved outwardly from the cylinder 1000 and the arm member 550 is moved in the direction of arrow 308 thus imparting rotation to clamp head 390, and as hydraulic fluid is pumped into cylinder 1000 (in the opposite direction as the first line) via a second line of the pair of hydraulic lines, the piston and rod 1100 is retracted inwardly into the cylinder 1000 and the arm member 550 is moved in the opposite direction of arrow 308 thereby resetting clamp head 390 for another movement cycle.

Quick Lock/Quick Unlock States For First and Second Arcuate Sections Frictional Squeezing Clamp The second ends 420,520 of first and second arcuate sections 400,500 can be pivotally connected together via pin 428. In one embodiment, tool 10 can include a quick lock/quick unlock for rotationally locking together the first ends 410,510 of first and second arcuate sections 400,500. In one embodiment the quick lock/quick unlock can include at least one biasing member 680 (and/or biasing member 684).

Figure 11:
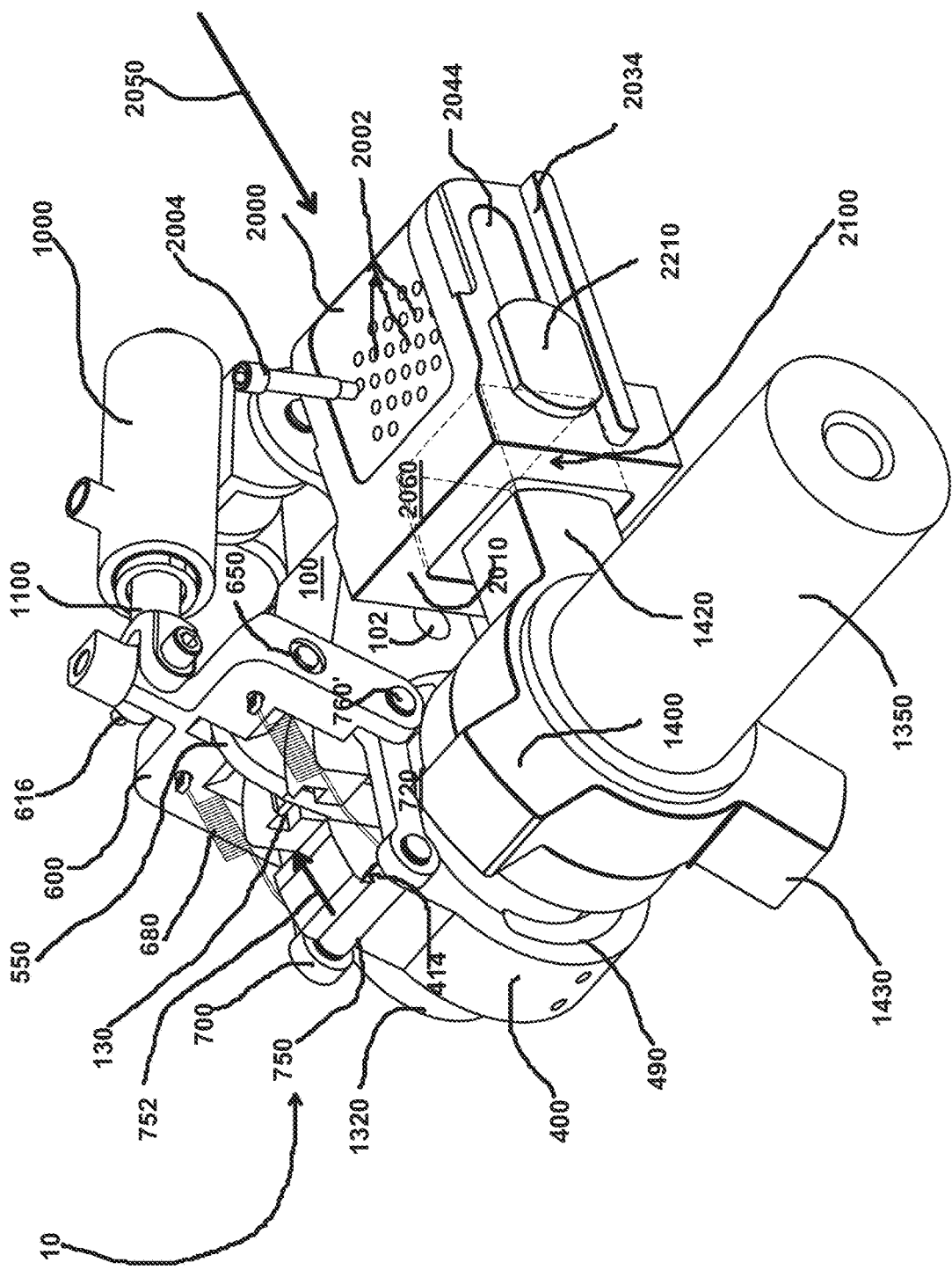
FIG. 11 is a perspective view of the tool of FIG. 7 (but taken from the opposite side of the tool as that shown in FIG. 7) showing the lug socket being positioned towards a selected lug in the hammer union.

In one embodiment first link 700 and second link 720 can be pivotally connected to fulcrum 600 (via fasteners 760, 760') at one end, and biased towards fulcrum 600 at their other ends (via biasing members 680,684 being connected to pin 750) such that pin 750 is tended to be pulled towards fulcrum 600 as schematically indicated by arrow 752 in FIGS. 11, 26 and 27.

Once pin 750 is placed under arcuate flange 414 (shown in FIG. 11) biasing members 680,684 will tend to pull pin 750 in the direction of arrow 752 which will tend to rotate first arcuate section 400 in the direction of arrow 324 tending to cause first and second arcuate sections 400,500 to squeeze together and create a small frictional squeezing force between first and second arcuate sections 400,500 (via inserts 490,590) and joint member 1320 which small frictional force can resist relative slipping between first and second arcuate sections 400,500 before extension of rod 1100 applies enough additional clamping force to first and second arcuate sections 400,500 through fulcrum 600 to frictionally lock clamping head 390 onto joint 1320 during the tightening or loosening of wing nut 1400.

When pin 750 is located under arcuate flange 414 and biased towards fulcrum 600, such state of frictional squeezing clamp head 390 is understood to be in a quick locked state. To place it in a quick unlocked state pin 750 is pulled out from under arcuate flange 414 by overcoming the biasing force of biasing members 680,684 along with manually pushing first end 410 of first arcuate section towards first end 510 of second arcuate section.

Lug Socket Receiving Lug of Wing Nut

Figure 7:
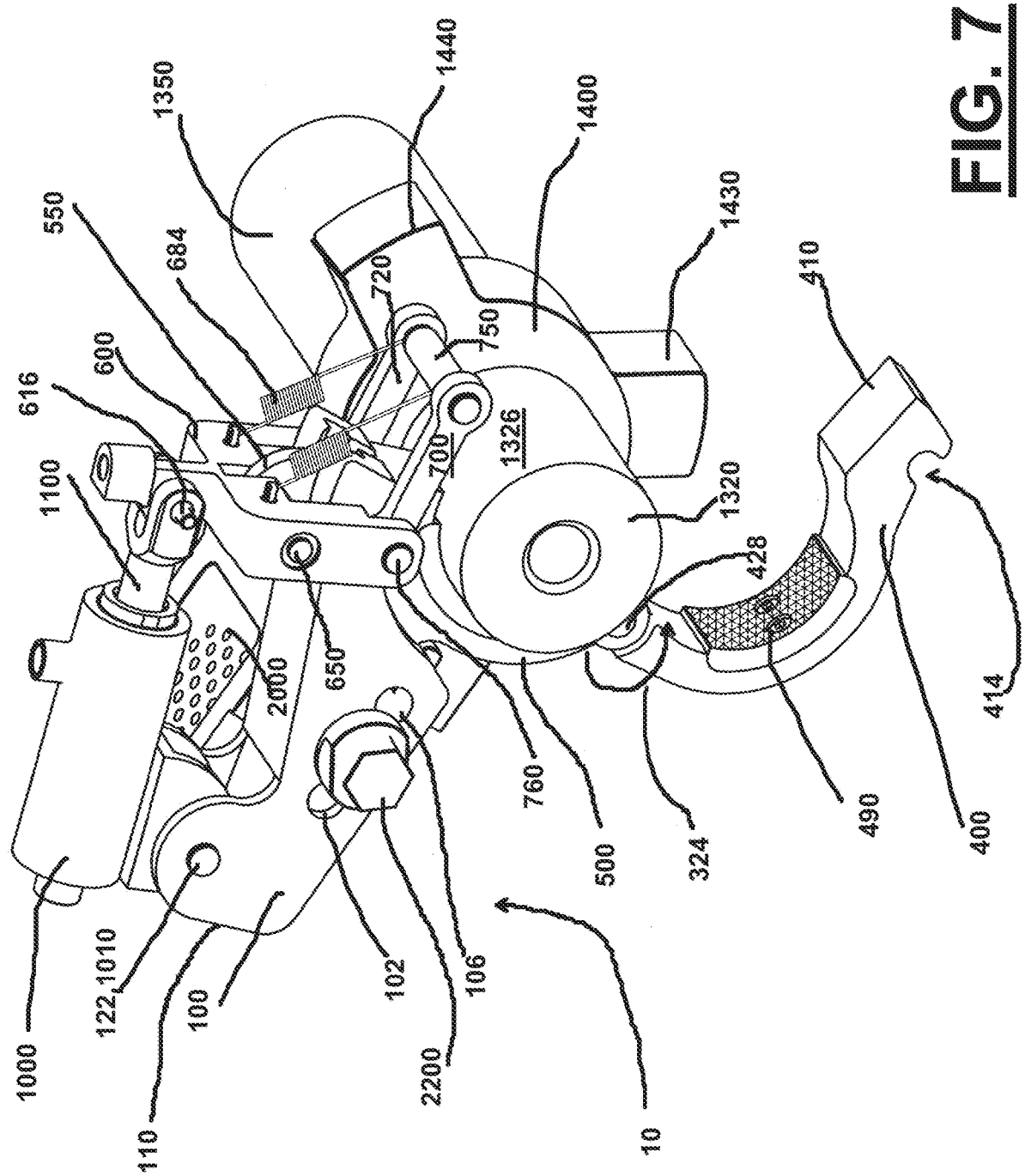
FIG. 7 is a perspective view of a preferred torque wrench tool placed over the tubulars of FIG. 6 with the jaws of the tool's frictional clamping head in a wide open state and the lug socket positioned to receive one of the lugs of the wing nut.
Figure 12:
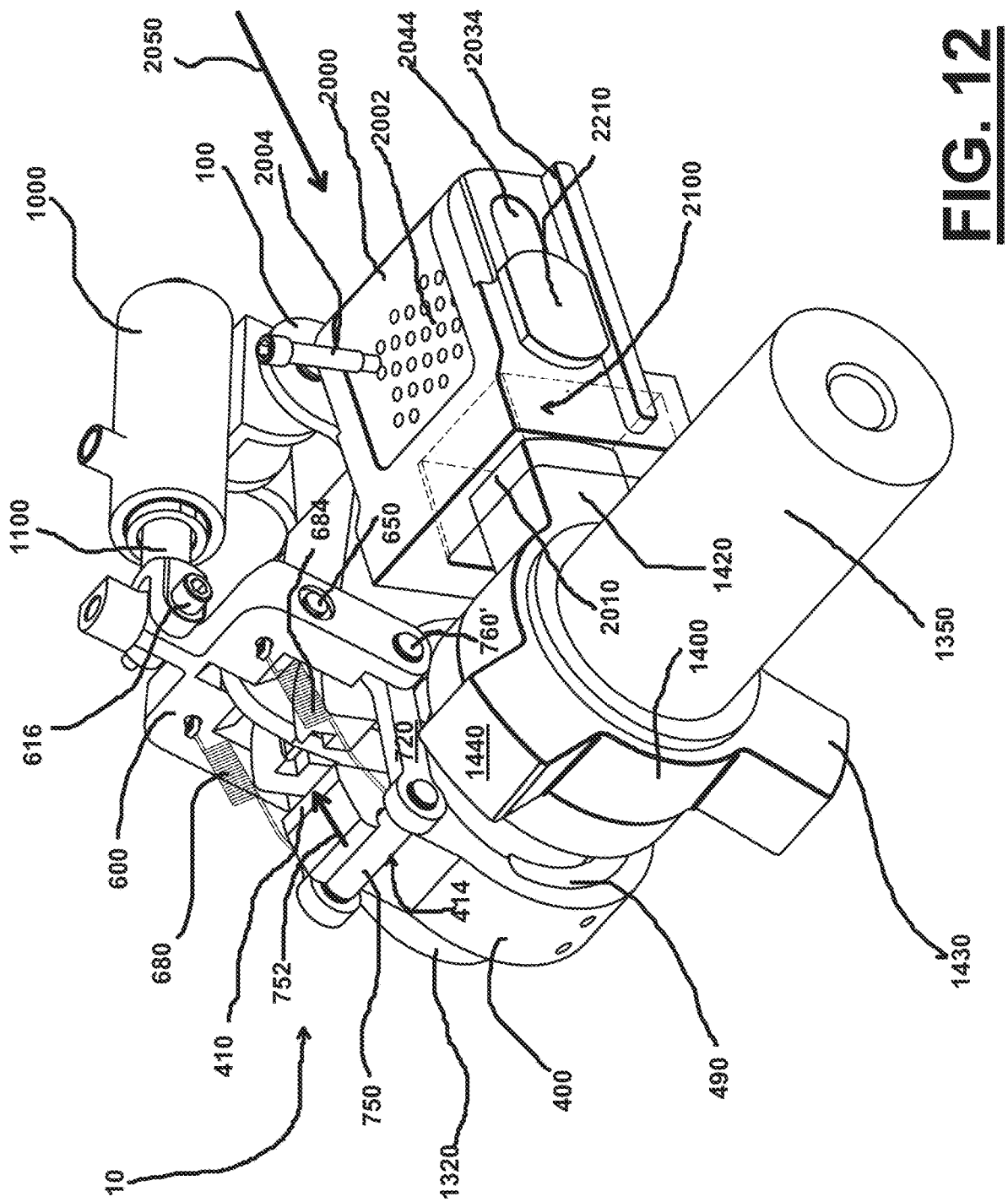
FIG. 12 is a perspective view of the tool of FIG. 11 with the lug socket slid partially over the selected lug.
Figure 13:
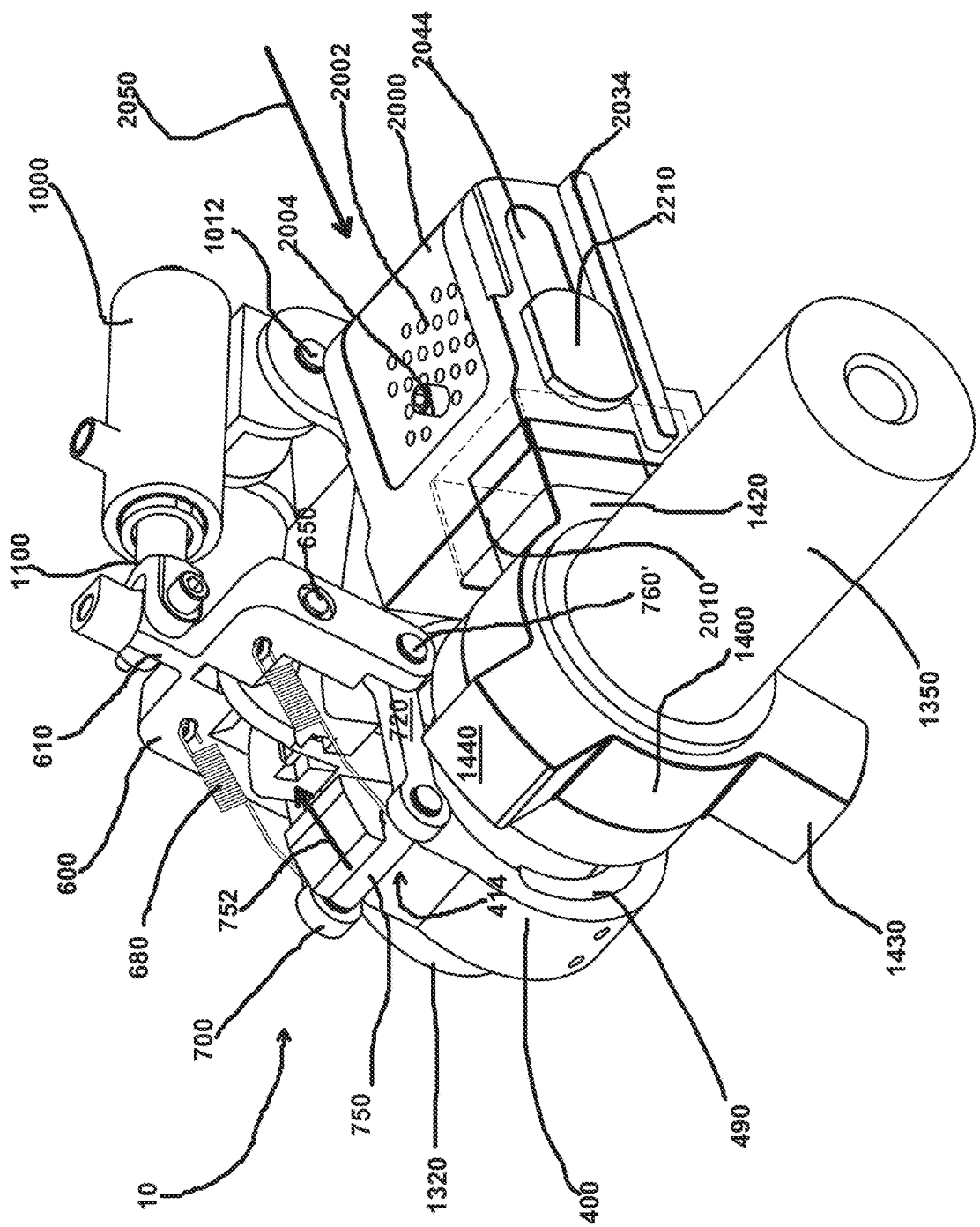
FIG. 13 is a perspective view of the tool of FIG. 11 with the lug socket fully slid over the selected lug, and with the lug sock interior shown in phantom lines.

FIG. 11 is a perspective view of tool 10 (but taken from the opposite side of tool 10 as that shown in FIG. 7) showing lug socket 2000 being positioned towards a selected lug 1420 of the hammer union wing nut 1400 (schematically indicated by arrow 2050). FIG. 12 is a perspective view of tool 10 now with the lug socket 2000 partially slid over lug 1420, and with lug 1420 entering lug socket interior 2100 (lug socket interior being shown in phantom lines). FIG. 13 is a perspective view of tool 10 now with lug socket 2000 fully slid over lug 1420.

Figure 20:
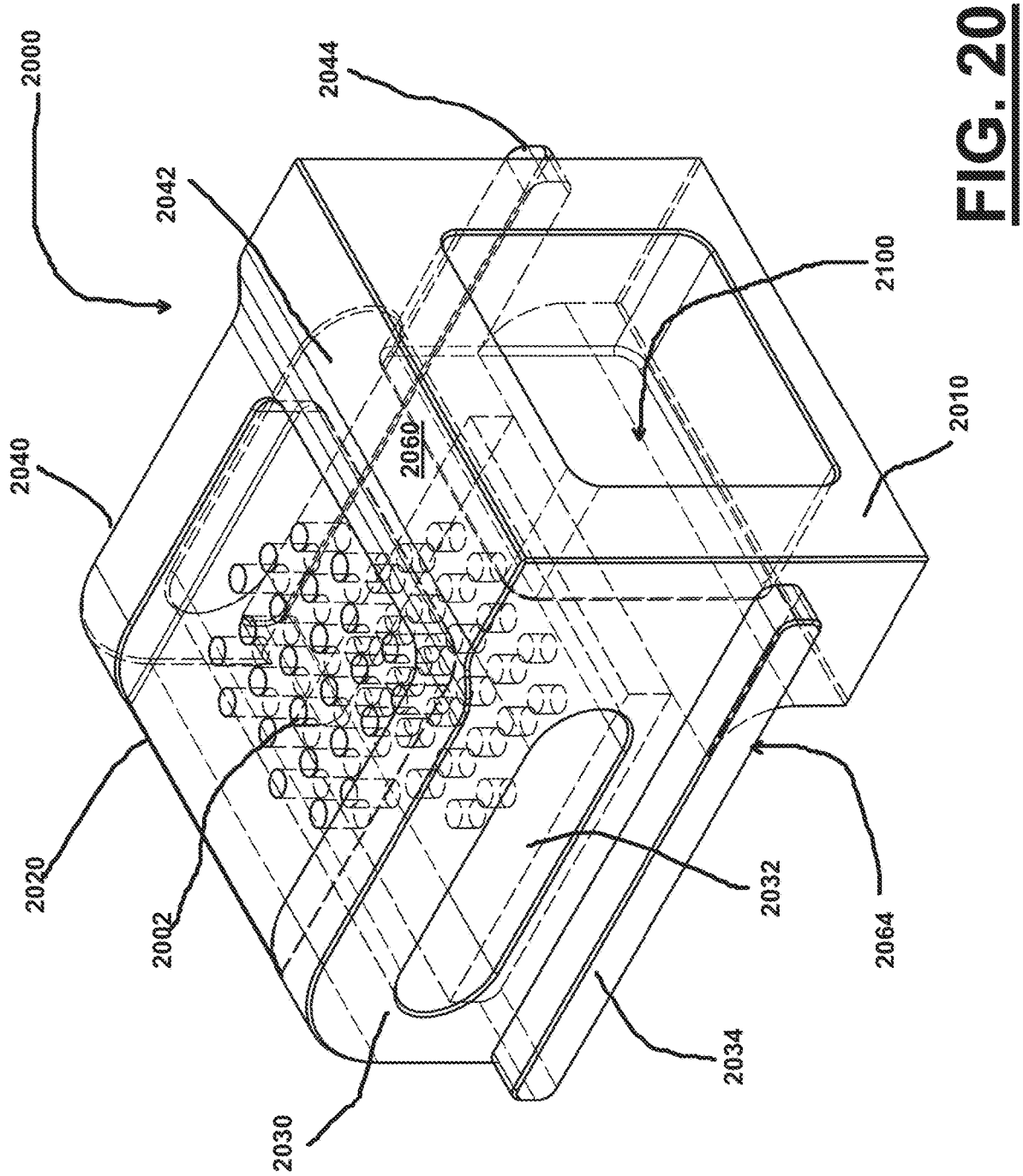
FIG. 20 is a perspective view of the lug socket.
Figure 21:
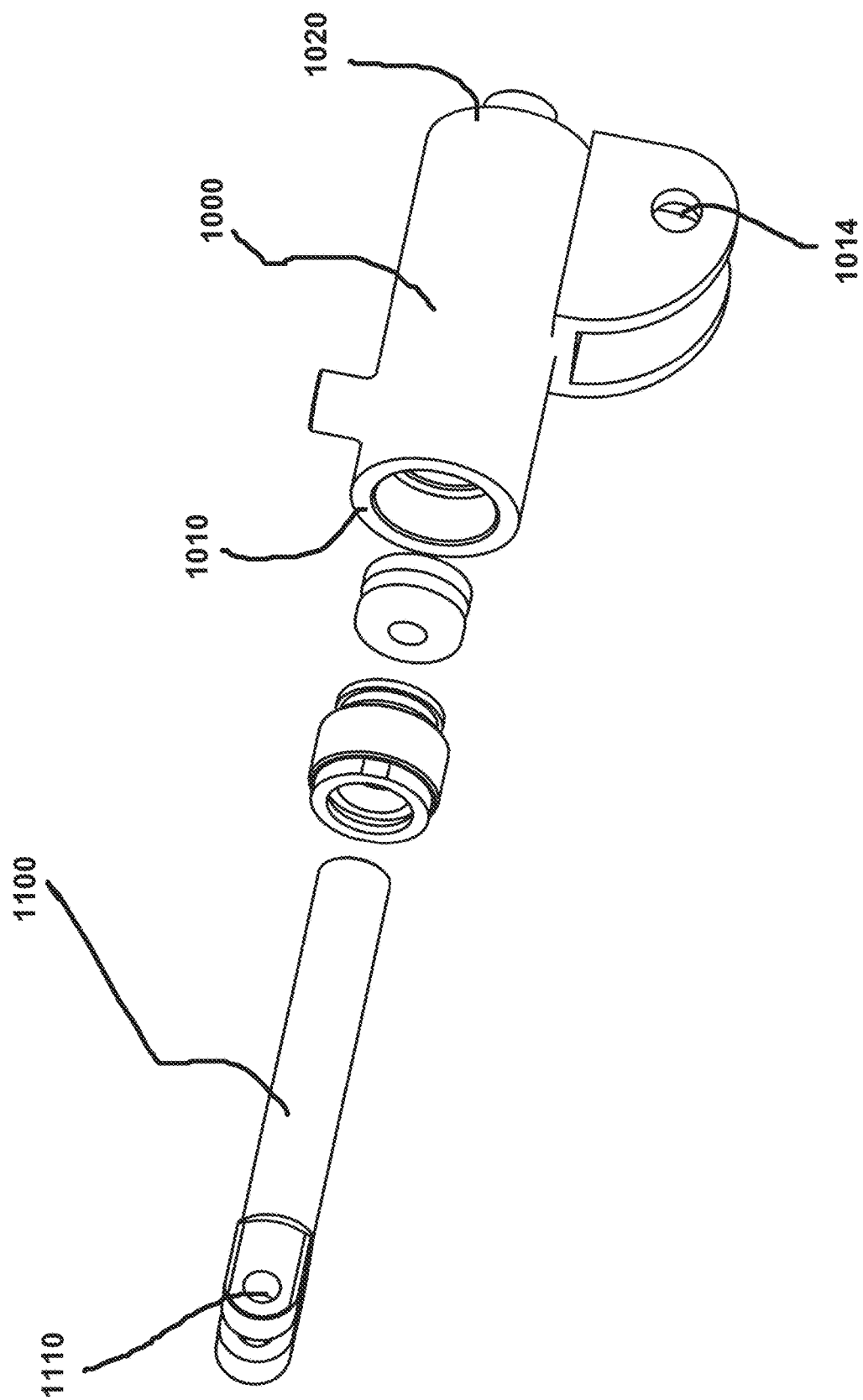
FIGS. 21 and 22 are exploded views of the piston rod and hydraulic cylinder.
Figure 22:
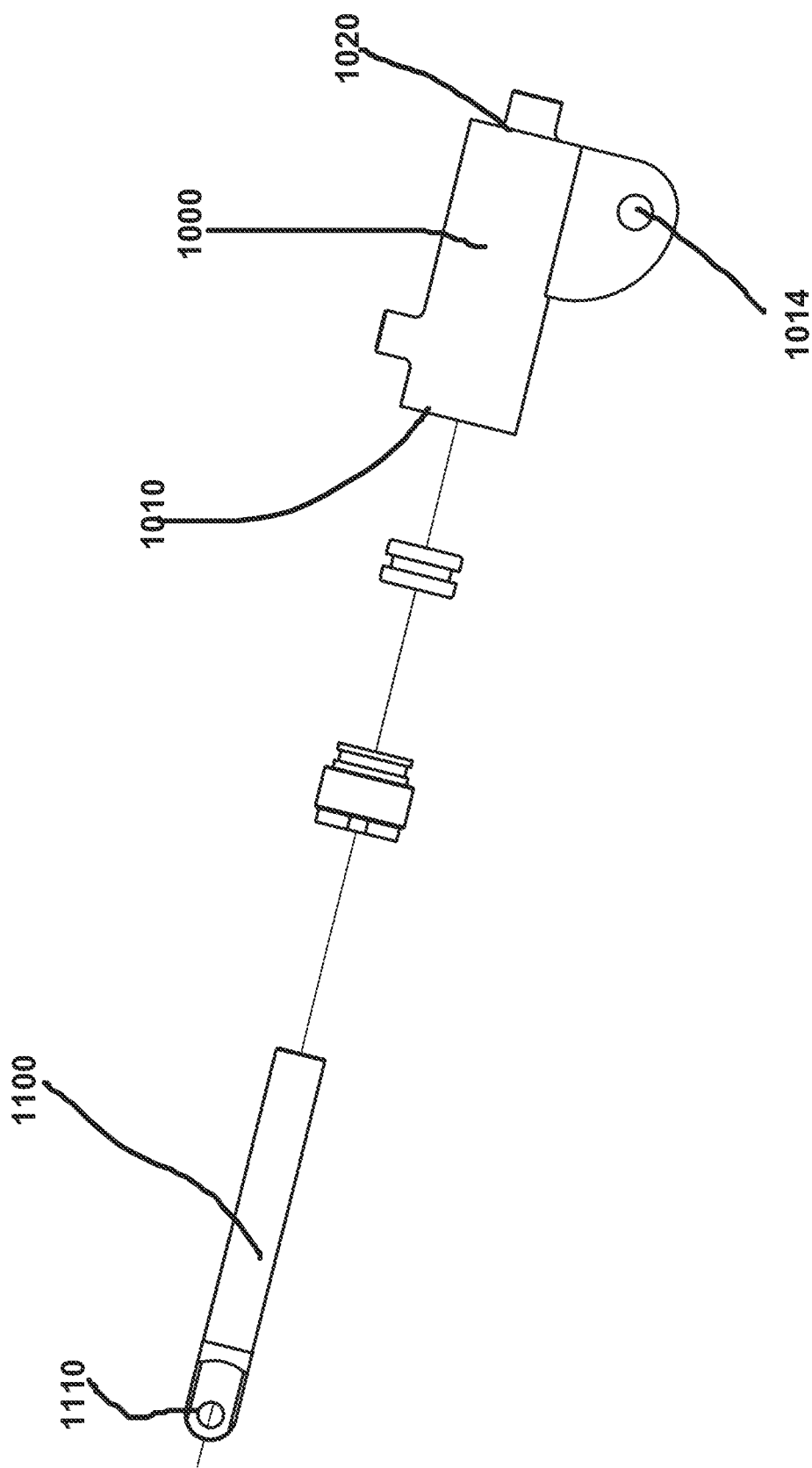
Figure 23:
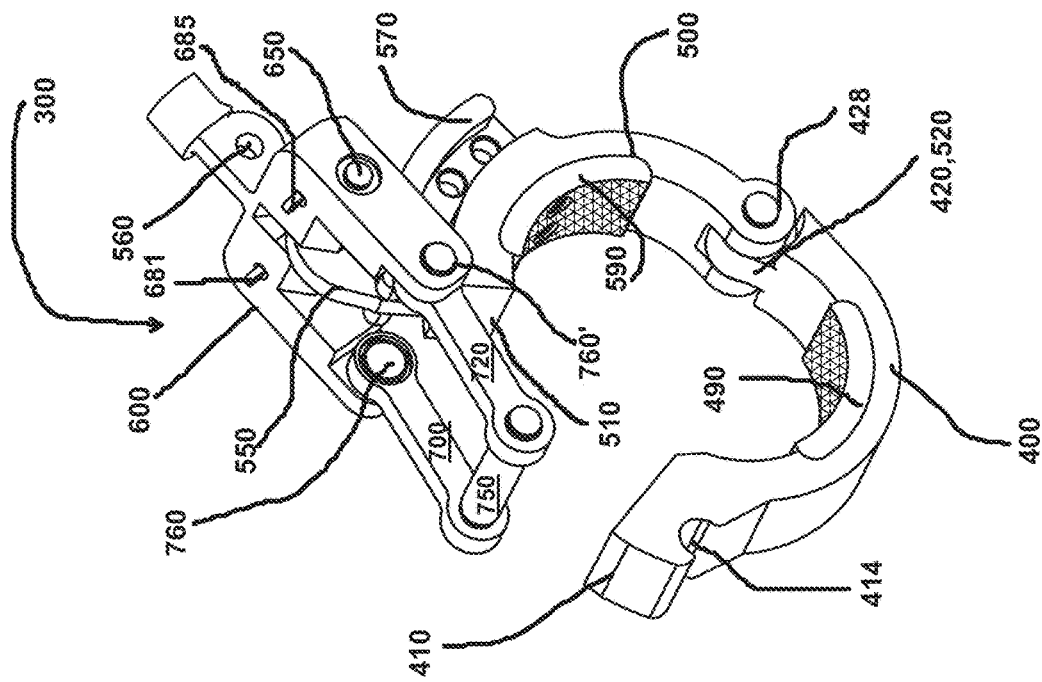
FIGS. 23 and 24 are perspective and side views of the tool's frictional clamping head in an open state.
Figure 24:
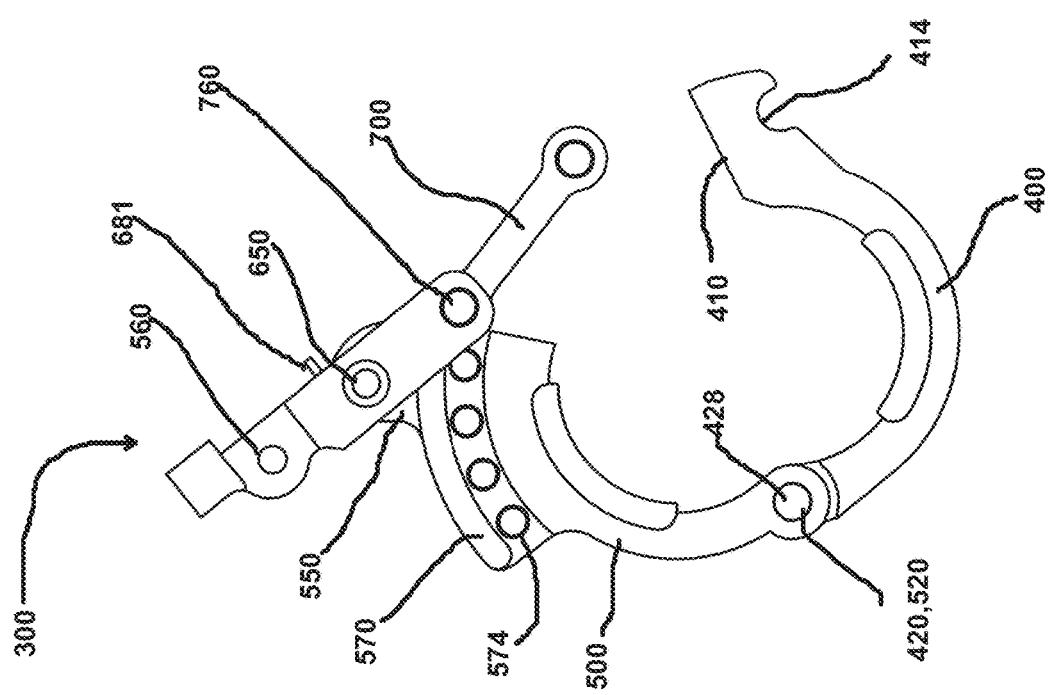
Figure 25:
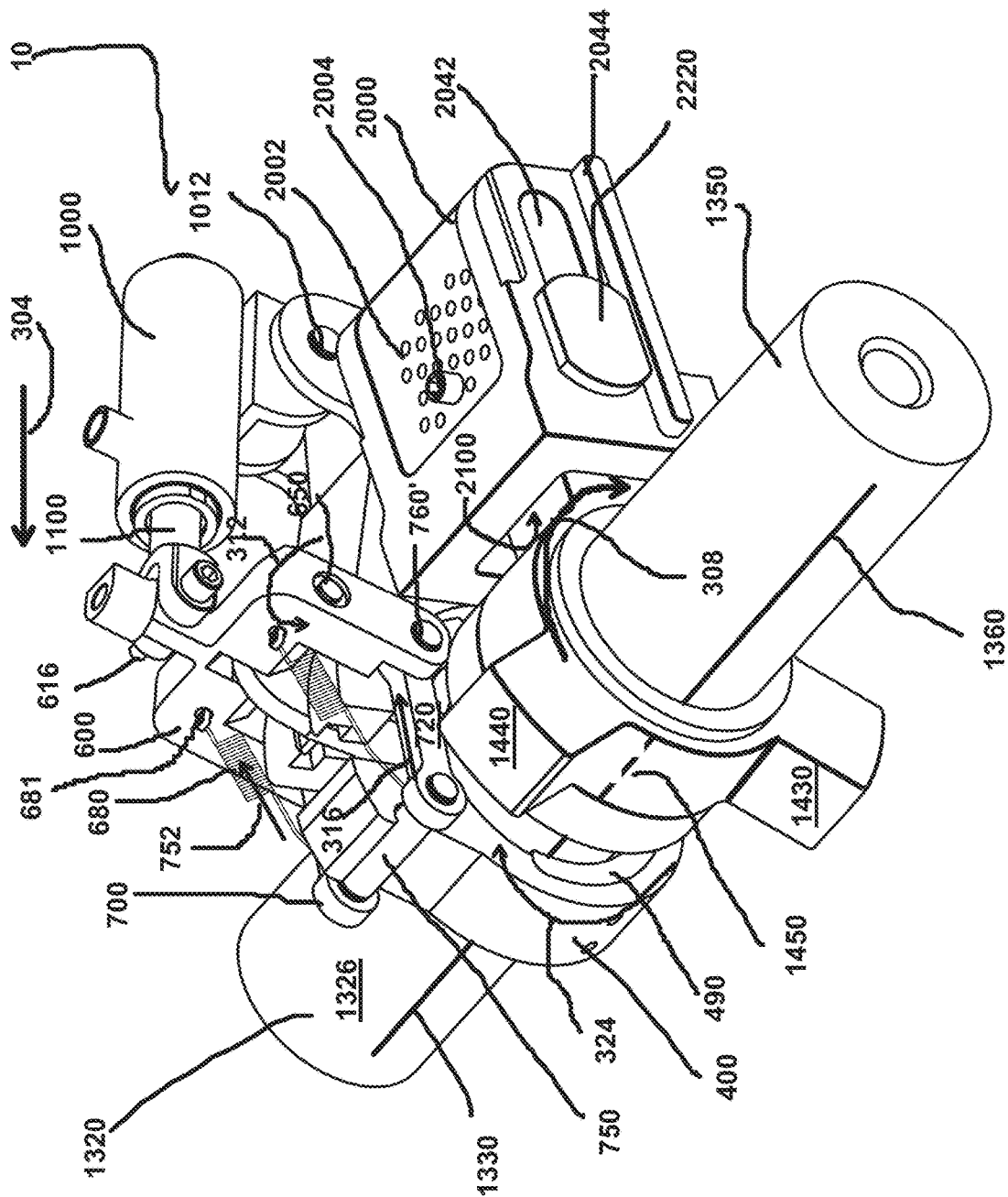
Figure 28:
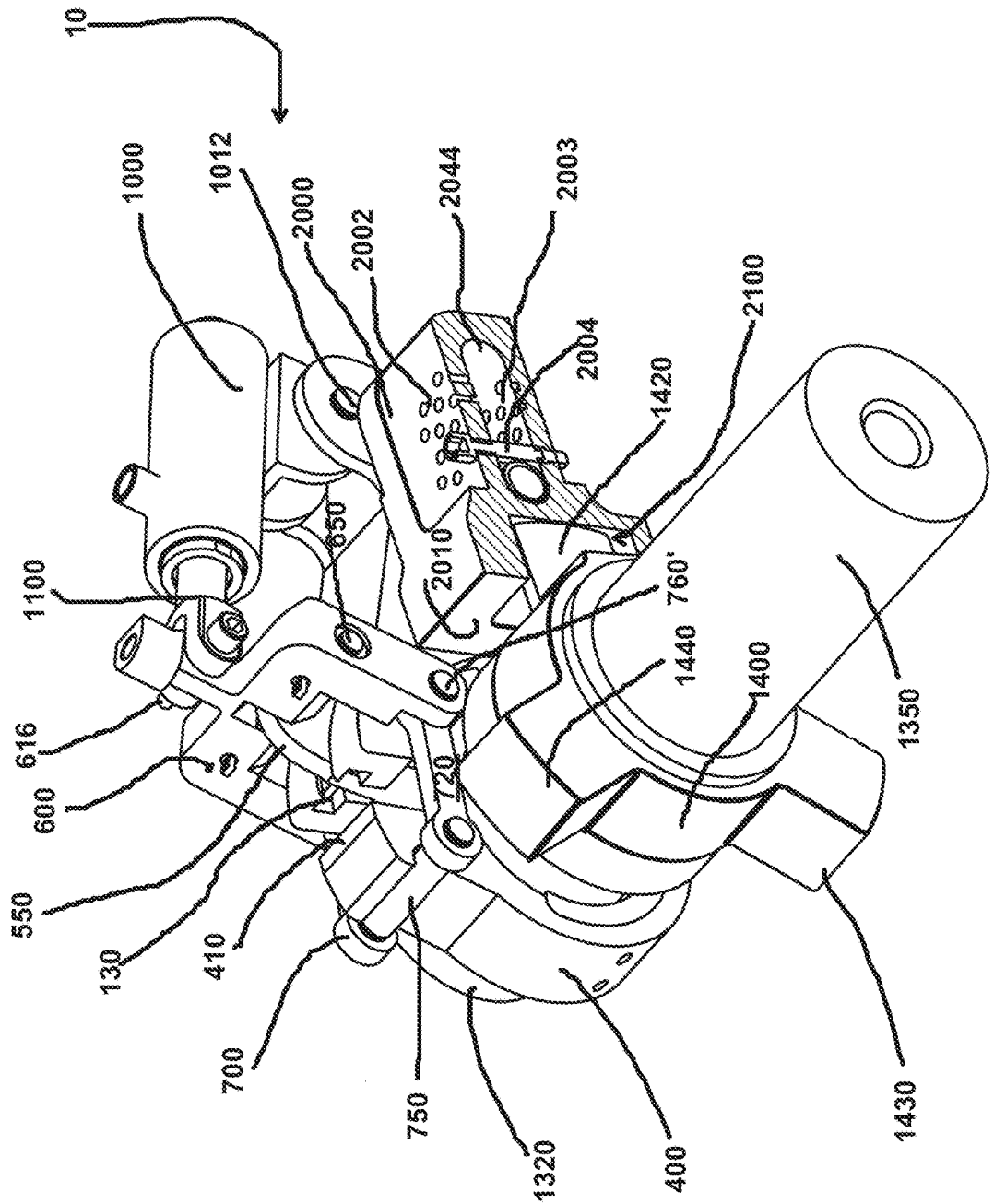
Figure 29:
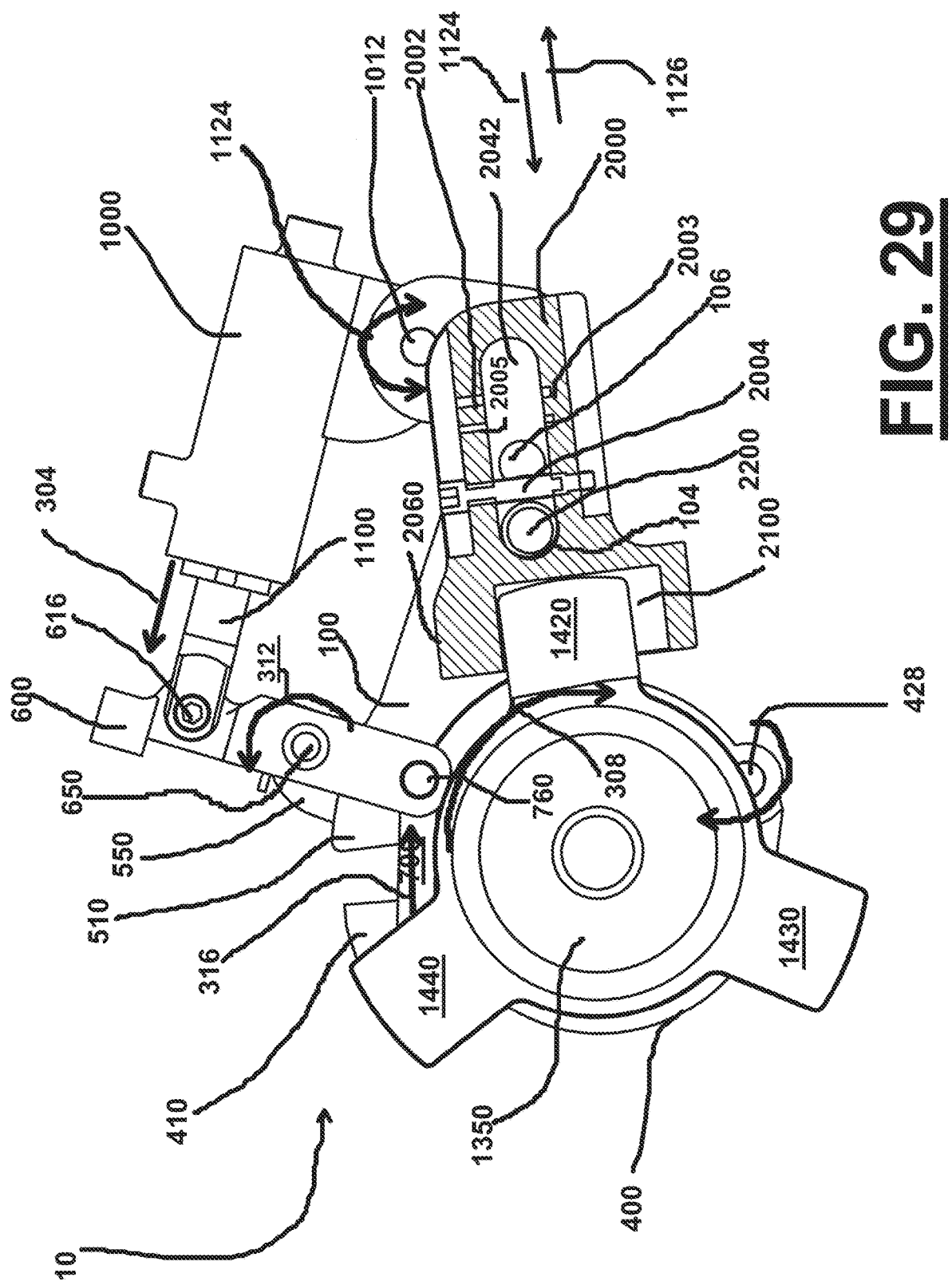

FIG. 20 is a perspective view of the lug socket or drive member 2000. Lug socket or drive member 2000 can include first end 2010 and second end 2020 along with first side 2030 and second side 2040. On first end can be socket opening 2100 for receiving the lug of a wing nut of a hammer union. Socket opening 2100 can be of various shapes and sizes, and depths to receive lugs of various shapes, sizes, and lengths.

Lug socket 2000 can be detachably connectable to wrench body 100 of frictional squeezing head 390. In one embodiment, lug socket 2000 can include slot 2032 and 2034 to allow socket 2000 to be attached to body 100 via a fastener such as bolt 2200. In one embodiment body 100 can include a plurality of spaced apart adjusting openings 102, 104, and/or 106 to allow relative radial spacing between the center of rotation of body 100 relative to squeezing/clamping head 390 and lug socket 2000. In one embodiment slots 2032 and 2034 can be sized to also allow selective radial positioning of lug socket 2000 relative to the center of rotation of body 100 relative to squeezing/clamping head 390.

In one embodiment lug socket 2000 can include reinforcing rib 2034 and/or reinforcing rib 2044 which press against body 100 to transfer turning loads between body 100 and lug socket 2000 in addition to bolt 2200.

In one embodiment, lug socket 2000 can include a plurality of openings to receive a locking pin 2004 which will limit the amount of radial sliding of lug socket 2000 relative to body 100. For example, in FIG. 29 were bolt 2200 to be placed in opening 106 instead of opening 104 and locking pin 2004 removed, lug socket could slide in the directions of arrows 1125 limited by the length of slot 2042. Such sliding could be enough that lug 1420 would come out of socket opening 2100 during an extension stroke of rod 1100 which would be dangerous. To avoid this risk, retaining pin 2004 could be placed in opening 2005 of plurality of openings 2006 thereby restricting the maximum movement of lug socket 2000 in the direction of arrow 1126 and keeping lug 1420 in socket opening 2100.

Extension Sequence

FIGS. 25 through 33 schematically illustrate various steps in the process of tightening a hammer union connection.

FIGS. 25-31 schematically illustrate the steps of rod 1100 engaging in an extension in the direction of arrow 304 causing frictional clamp head 390 (comprising first and second arcuate sections 400,500) to enter a contracting/squeezing state thereby causing clamp head 390 to frictionally connect with surface 1326 of joint 1320, thereby causing clamp head 390 to remain rotationally static relative to joint 1320 (and pipe 1300), to ultimately cause body 100, lug socket 2000, lug 1420, and finally wing nut 1400 to turn in the direction of arrow 308.

Before and during extension of rod 1100 in the direction of arrow 304 one or more biasing members 680,684 such as springs can be used to pulling in the direction of arrow 752 and causing first and second arcuate sections 400,500 to contract/squeeze enough so that squeezing frictional clamp head 390 will not rotate relative to joint 1320 to allow fulcrum 600 to rotate in the direction of arrow 312 relative to second arcuate section causing first arcuate section 400 to rotate in the direction of arrow 400. Without the one or more biasing members 680,684 as rod 1100 extends in the direction of arrow 304 first and second arcuate sections 400,500 could merely slide relative to joint 1320 without entering a squeezing state.

As sequentially shown in FIGS. 25-31, the extension turning mechanics of clamp head 390 can occur as follows. Rod 1100 extending in the direction of arrow 304 imposes a force on first portion 610 of fulcrum lever 600 (in the direction of arrow 304) creating a turning torque on clamp head 390 (in the direction of arrow 308) because fulcrum lever 600 is pivotally connected to clamp head 390 through arm member 550. Rod 1100 imposing a force on first portion 610 of fulcrum lever 600 also creates a turning torque (in the direction of arrow 312) on fulcrum lever 600 about its pivot point on arm member 550 (located at opening 640), which in turn creates a pulling force on links 700,720 (in the direction of arrow 316), which in turn cause a pulling force on first arcuate section 400 (in the direction of arrow 316), which in turn causes a torsional turning torque on first arcuate section relative to second arcuate section about their pivot point 420,520 (in the direction of arrow 324). The torsional force of first arcuate section 400 relative to second arcuate section 500 (in the direction of arrow 324) along with the pulling force on first arcuate section 400 (in the direction of arrow 320) causes first arcuate section 400 to close relative to second arcuate section 500 (schematically indicated by arrows 328) causing a frictional force to be generated between clamp head 390 and surface 1326 of joint 1320, which frictional force allows clamp head 390 to remain rotationally static as body 100 and lug socket 2000 actually turn selected lug 1420 and wing nut 1400 (in the direction of arrows 310) as track 570 of second arcuate section 500 moves within arcuate slot 130 of body 100 (in the direction of arrow 308).

Figure 30:
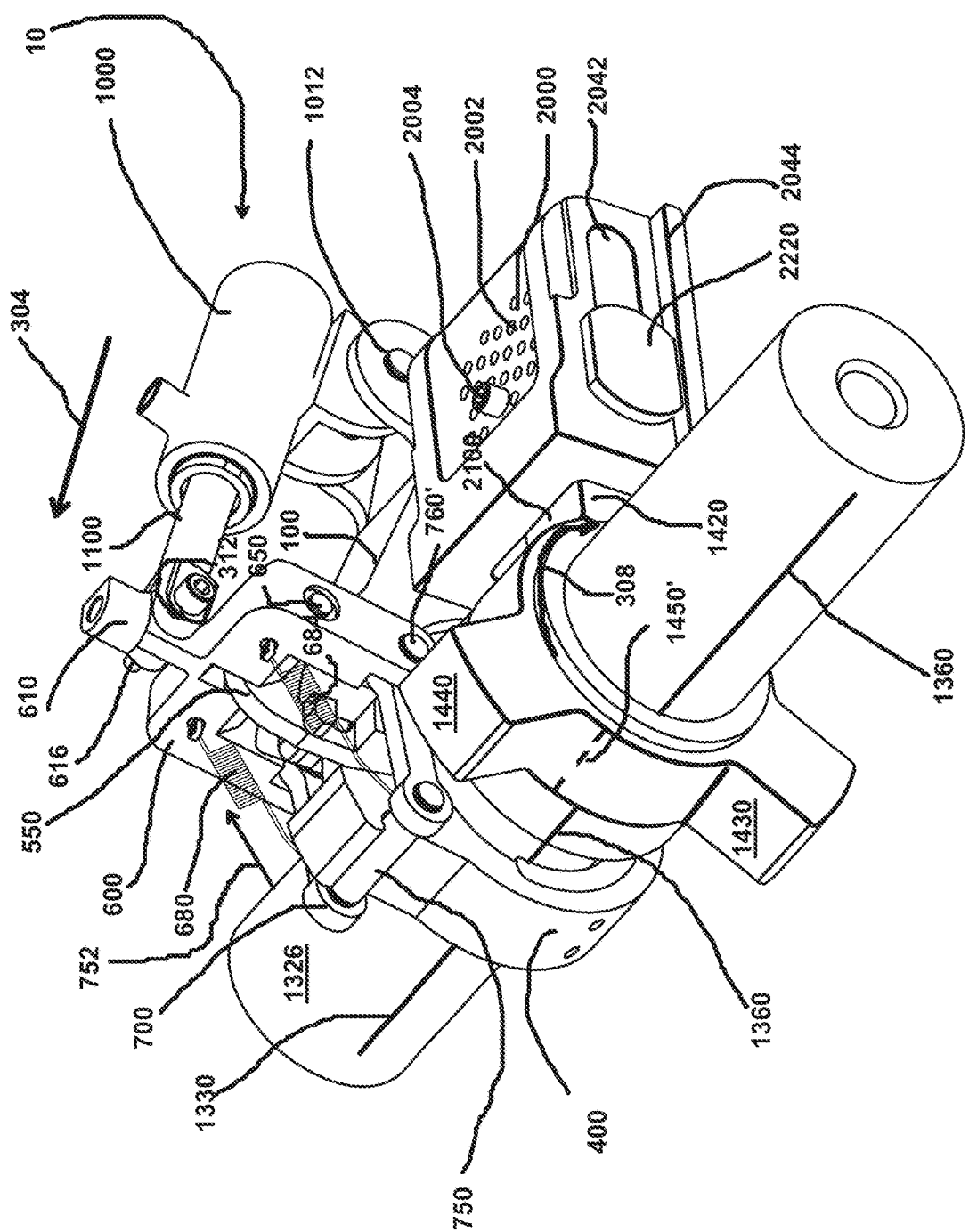
Figure 31:
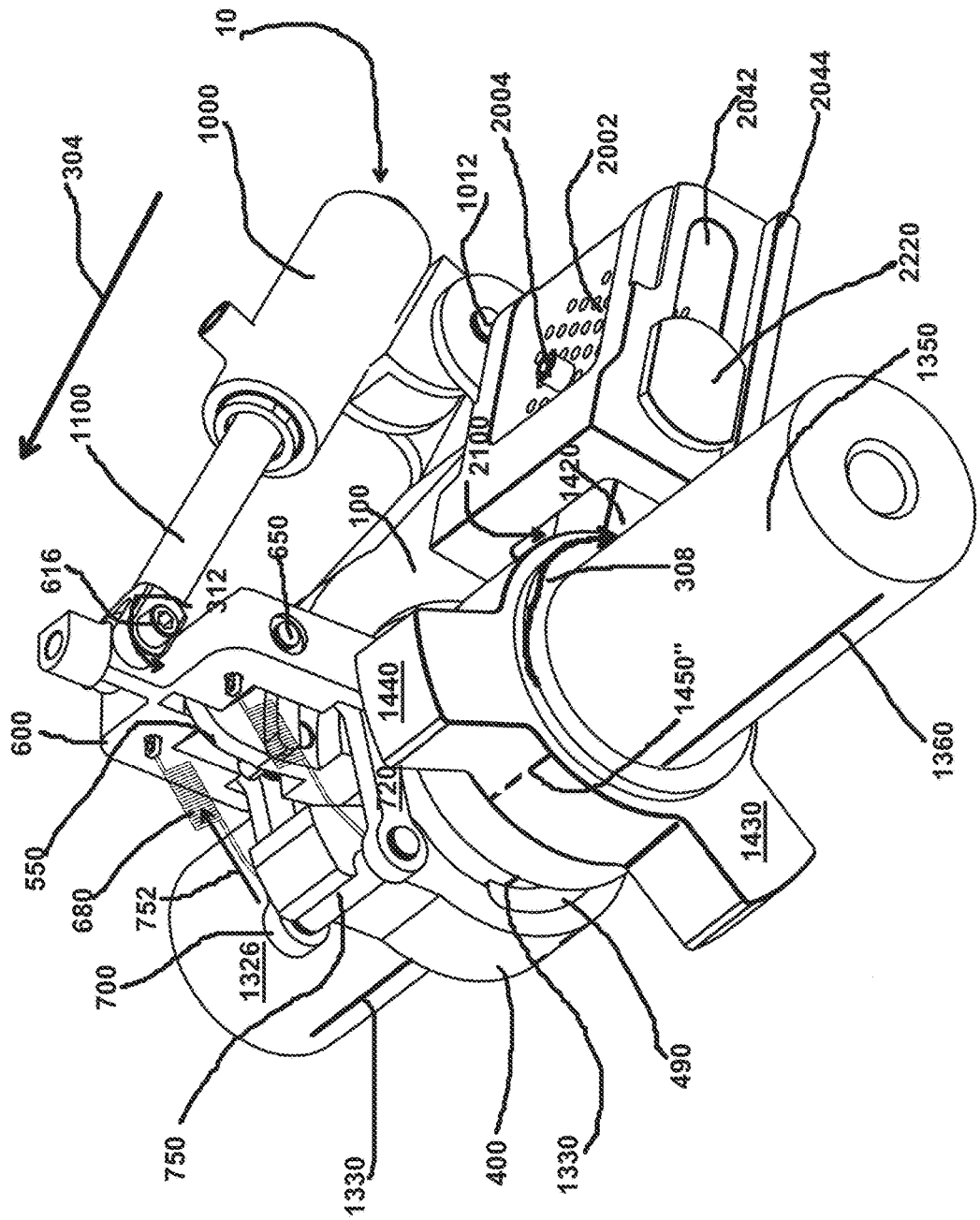

FIG. 30 is a side view showing rod 1100 continuing to extend in the direction of arrow 304 with clamp head 390 remaining a contracting/squeezing state thereby causing it to remain rotationally static relative to joint 1320 (and tubular/pipe 1300), thereby causing body 100 with connected lug socket 2000 to continue to turn in the direction of arrow 310 (with arrows 1310 and 1312 now schematically indicating the relative rotation of wing nut 1400 to tubular/pipe 1300). In this manner, during an extension stroke of rod 1100 item, wing nut 1400 can be turned relative to tubular/pipe 1300 (e.g., from arrow 1310 to arrow 1312). FIG. 31 is completion of extension.

Retraction Sequence

FIGS. 34 through 38 schematically illustrate various steps in the process of loosening the hammer union connection.

As sequentially shown in FIGS. 34-38, the retraction ratcheting mechanics of clamp head 390 can occur as follows. Rod 1100 retracting in the direction of arrow 304' imposes a force on first portion 610 of fulcrum lever 600 (in the direction of arrow 304') creating a turning torque on clamp head 390 (in the direction of arrow 308') because fulcrum lever 600 is pivotally connected to clamp head 390 through arm member 550. Rod 1100 imposing such force on first portion 610 of fulcrum lever 600 also creates a turning torque (in the direction of arrow 312') on fulcrum lever 600 about its pivot point on arm member 550 (located at opening 640), which in turn creates a pushing force on links 700,720 (in the direction of arrow 316'), which in turn cause a pushing force on first arcuate section 400 (in the direction of arrow 316'), which in turn causes a torsional turning torque on first arcuate section relative to second arcuate section about their pivot point 420,520 (in the direction of arrow 324'). The torsional force of first arcuate section 400 relative to second arcuate section 500 (in the direction of arrow 324') along with the pushing force on first arcuate section 400 causes first arcuate section 400 to open relative to second arcuate section 500 (schematically indicated by arrows 330) minimizing any a frictional force between clamp head 390 and surface 1326 of joint 1320, which minimal frictional force is easily overcome to allow clamp head 390 to turn relative joint 1320 or tubular/pipe 1300 (in the direction of arrow 308') as track 570 of second arcuate section 500 moves within arcuate slot 130 of body 100—without turning wing nut 1400 for the next extension cycle of rod 1100 (this relative movement of clamp head 390 to tubular/pipe 1300 is called the ratcheting movement of clamp head 390).

When rod 1100 is retracted (in the direction of arrow 304'), clamp head 390 will enter an expanded state (schematically indicated by plurality of arrows 330 in FIG. 34) allowing clamp head 390 to rotatively slide relative to joint 1320 and tubular/pipe 300 in the direction as arrow 308', while lug 1420 remains in lug socket 2000—setting up the next extension cycle for rod 1100.

Before and during retraction of rod 1100 in the direction of arrow 304', the biasing force of one or more biasing members 680,684 schematically indicated by arrow 752 and and causing first and second arcuate sections 400,500 to contract/squeeze is overcome by retraction of rod 1100 causing fulcrum 600 to rotate in the direction of arrow 312' relative to second arcuate section 500 causing first arcuate section 400 to rotate in the direction of arrow 400'. Retraction of rod 1100 overcomes the tendency of the one or more biasing members 680,684 to cause squeezing of clamping head 390 thereby allowing first and second arcuate sections 400,500 to slide or rotate relative to joint 1320 without entering a squeezing state.

Figure 36:
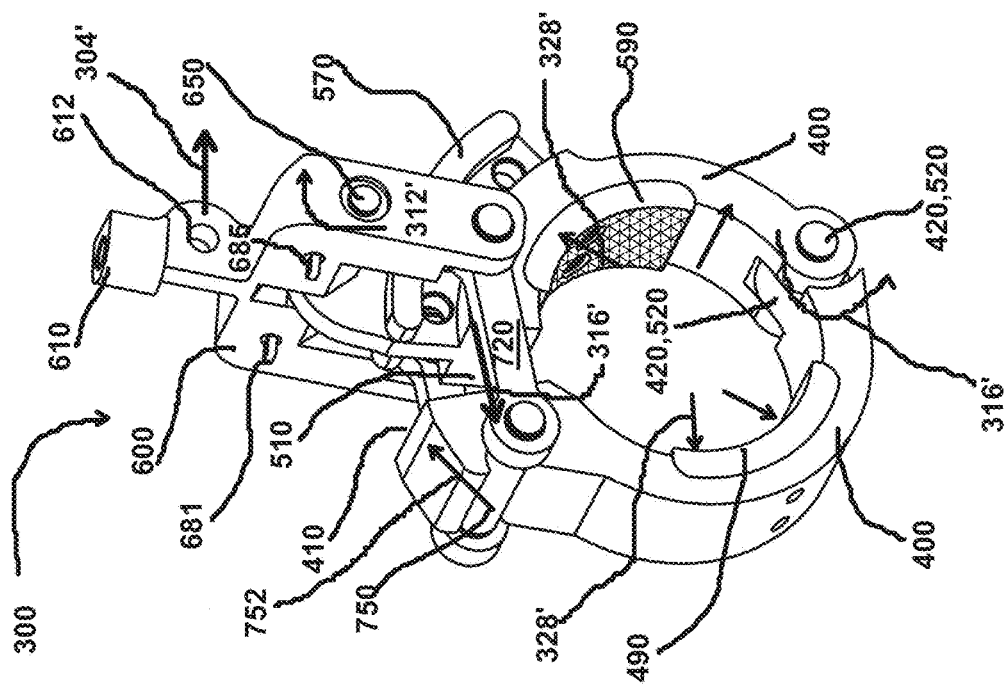
Figure 35:
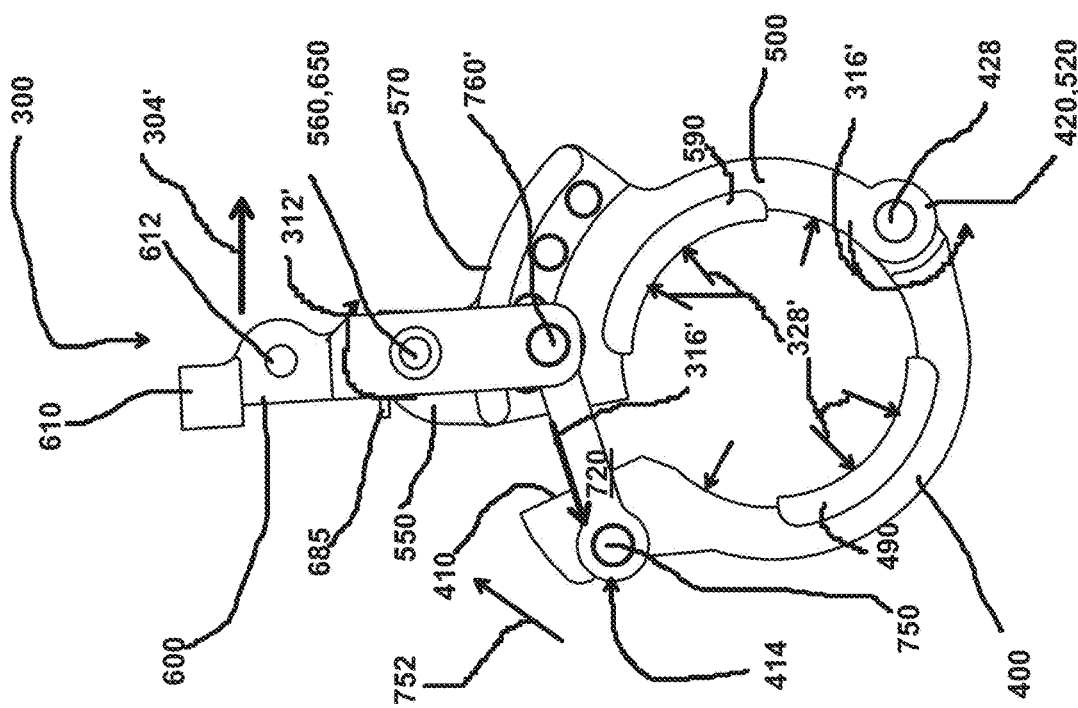
Figure 37:
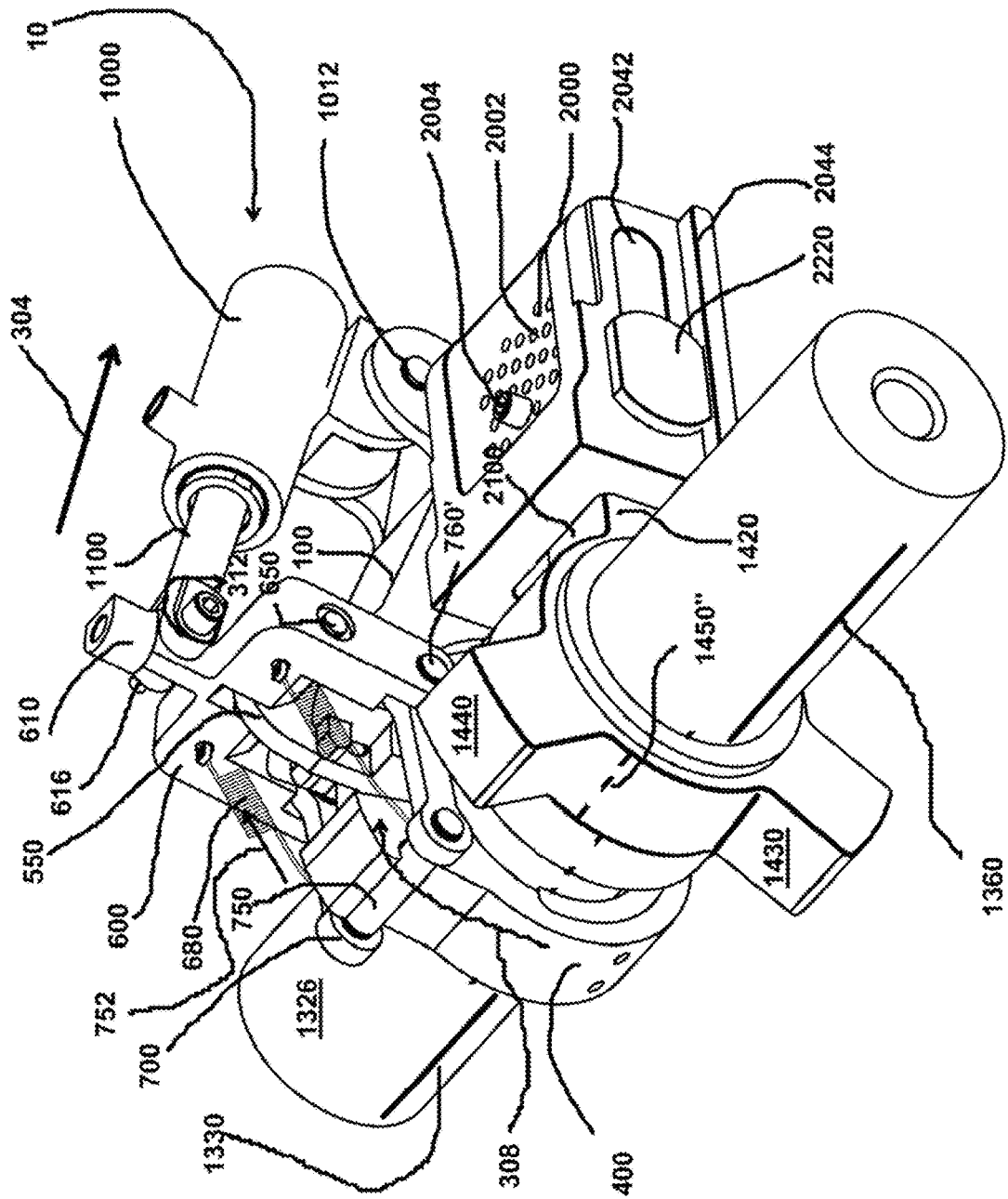
Figure 38:
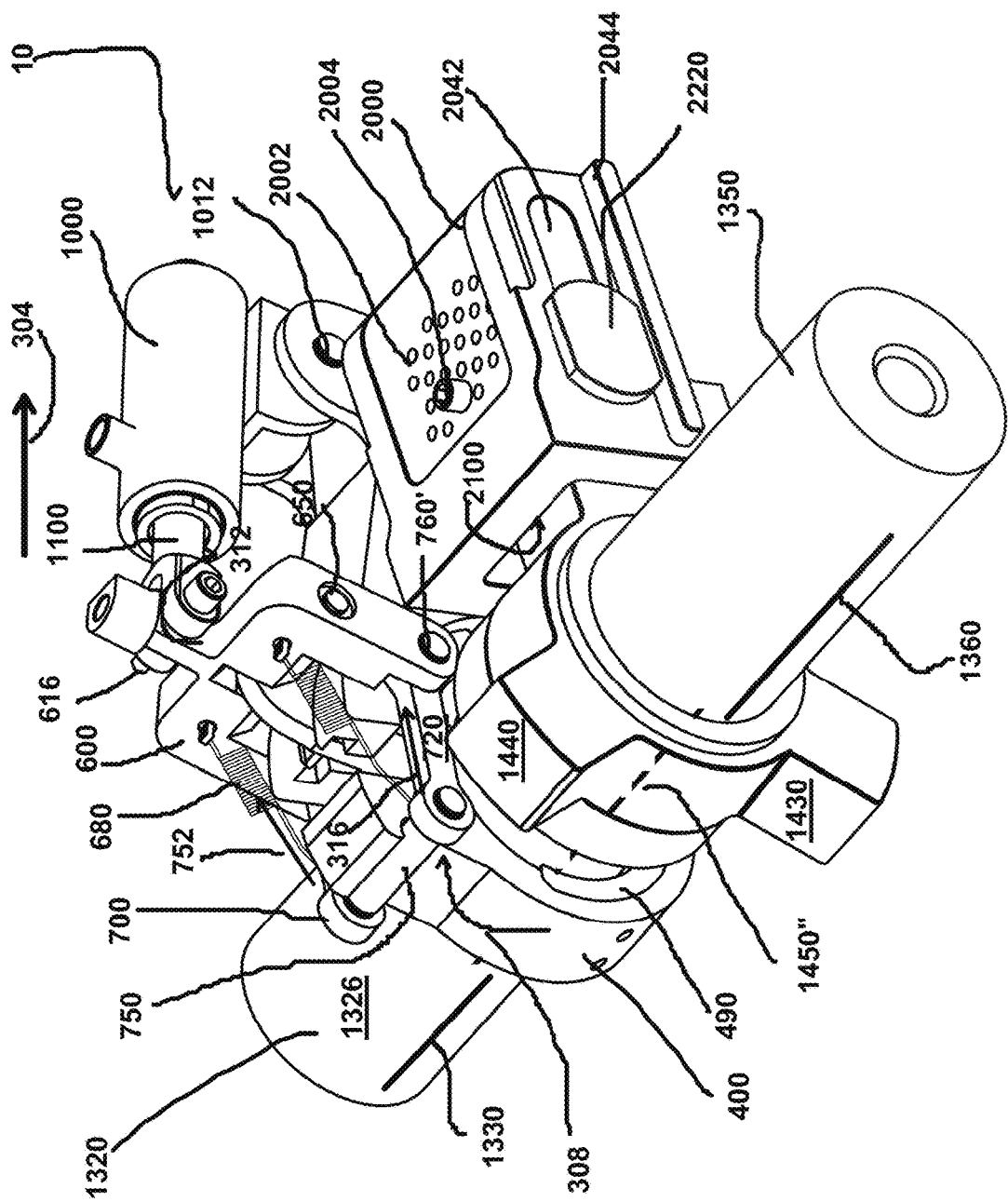

In similar manner to that described above, clamp head 390 can ratchet back and forth over joint 1320 and tubular/pipe 1300—with lug socket 2000 turning lug 1420 and wing nut 1400 when clamp head 390 is in a contracted/squeezing state (i.e., when rod 1100 is extending in the direction of arrow 304 with squeezing/contracting schematically indicated by plurality of arrows 328 in FIGS. 26 and 27), and slipping over joint 1320 and tubular/pipe 1300 when clamp head 390 is in an expanded state (i.e., when rod 1100 is retracting in the direction of arrow 304' with expansion schematically indicated by plurality of arrows 330 in FIGS. 35 and 36)—while the clamp head 390 remains closed in both the squeezing/contracted and expanded states.

Figure 8:
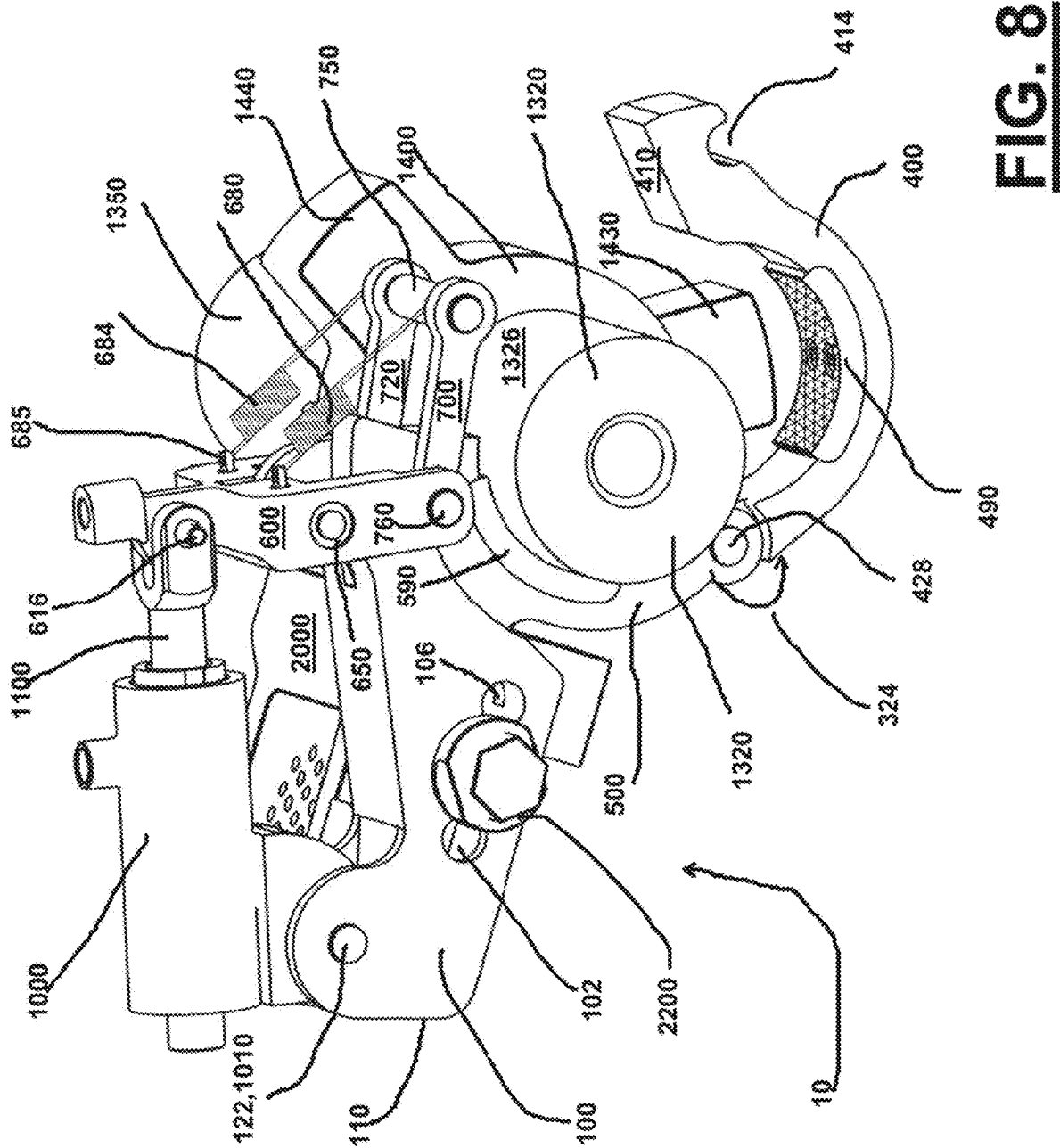
FIG. 8 is a perspective view of the tool of FIG. 3 with the second jaw being positioned toward a closed state.
Figure 9:
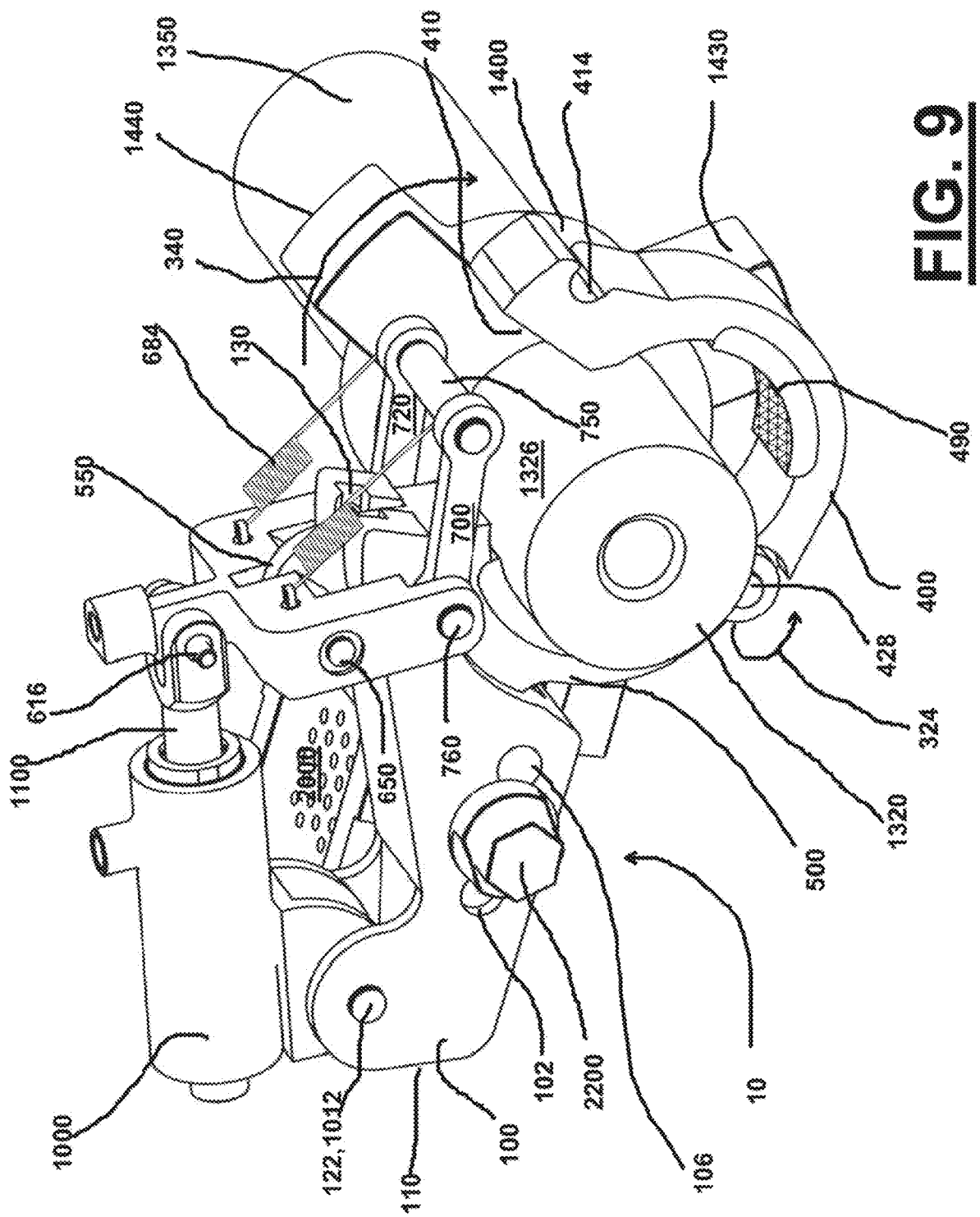
FIG. 9 is a perspective view of the tool of FIG. 3 with the second jaw being almost in a closed state.
Figure 10:
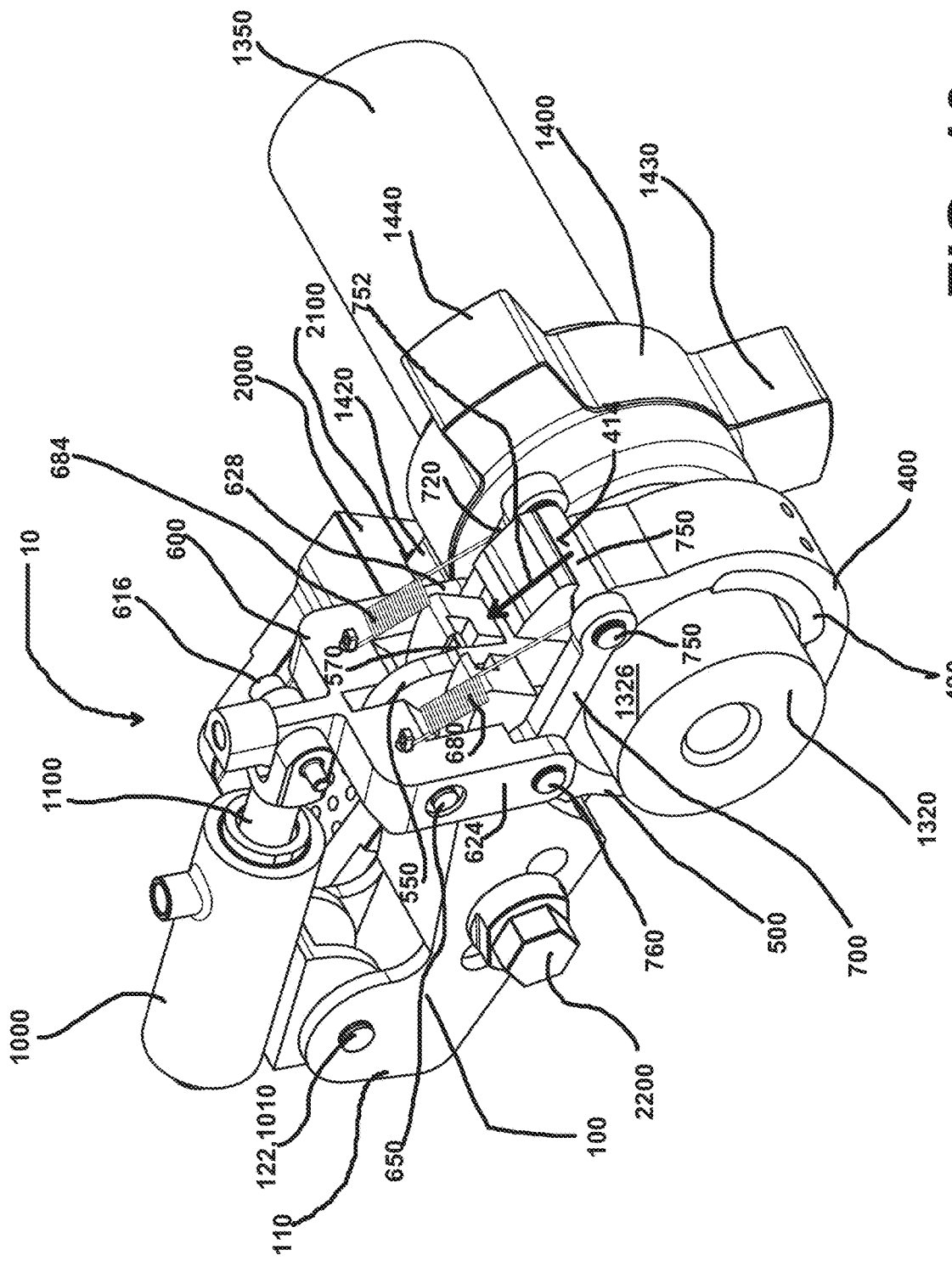
FIG. 10 is a perspective view of the tool of FIG. 3 with the second jaw being in a closed state.

FIG. 7 is a perspective view of a preferred torque wrench tool 10 being placed in position to tighten the hammer union wing nut 1400 to connect joints 1320 and 1350. In this position the jaws 400,500 of the tool's frictional clamping head 300 are in a wide open state allowing the head 300 to be placed over one of the joints 1320, the surface 1326 of which the head 300 can be clamped onto. Arrow 324 schematically indicates the closing of jaw or first arcuate section 400 over joint 1320. FIG. 8 is a perspective view of tool 10 with jaw 400 being positioned toward a closed state—with first end 410 being brought closer to first end 510 of jaw or second arcuate section 500. FIG. 9 is a perspective view of tool 10 with jaws 400,500 being almost in a closed state. FIG. 10 is a perspective view of tool 10 with jaws 400,500 being in a closed state. When in jaws 400,500 are in a closed state locking pin 750 is located in recess 414 of jaw 400. When locking pin 750 is located in recess 414, it is biased towards first end 510 of jaw 500. In the embodiment shown, when tool 10 is at rest, biasing members 680,684 perform the biasing function which is schematically indicated by arrow 752.

Figure 32:
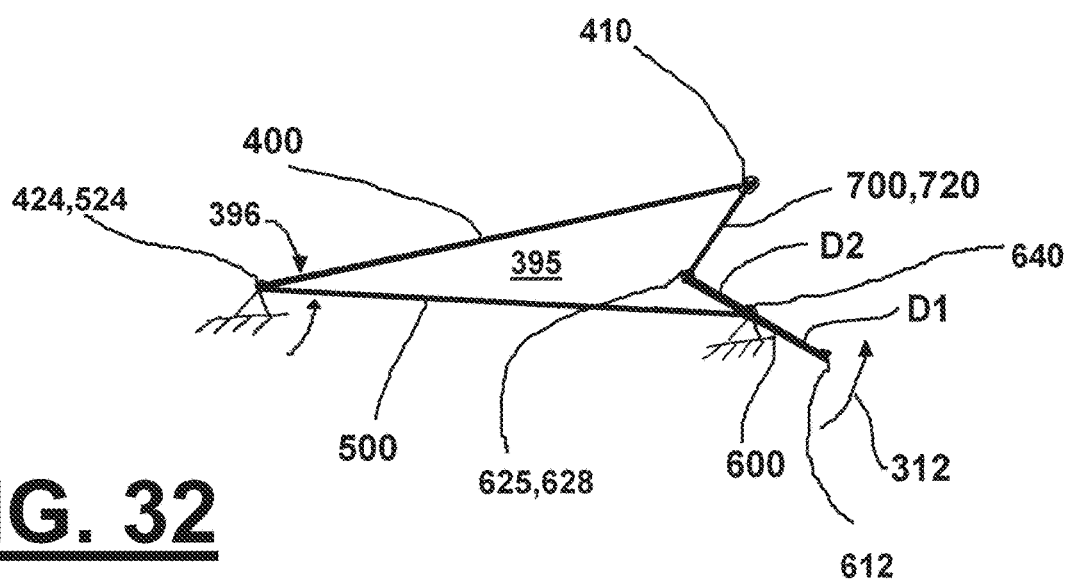
Figure 33:
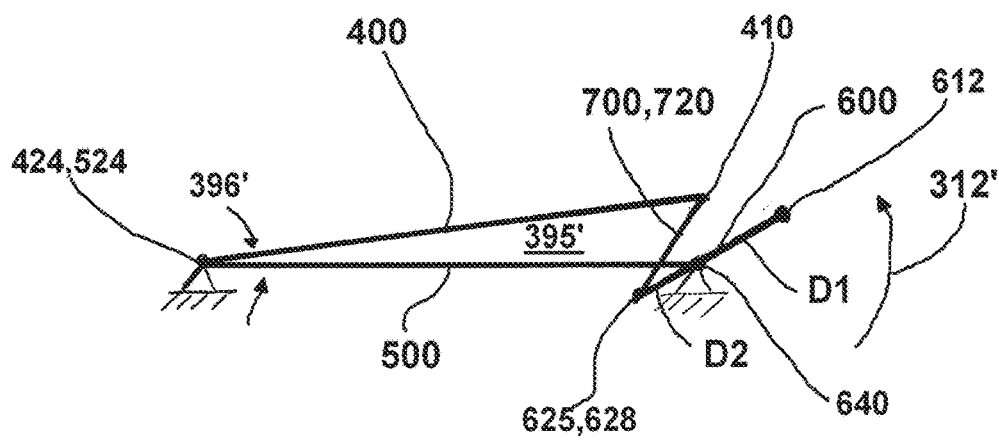
Figure 34:
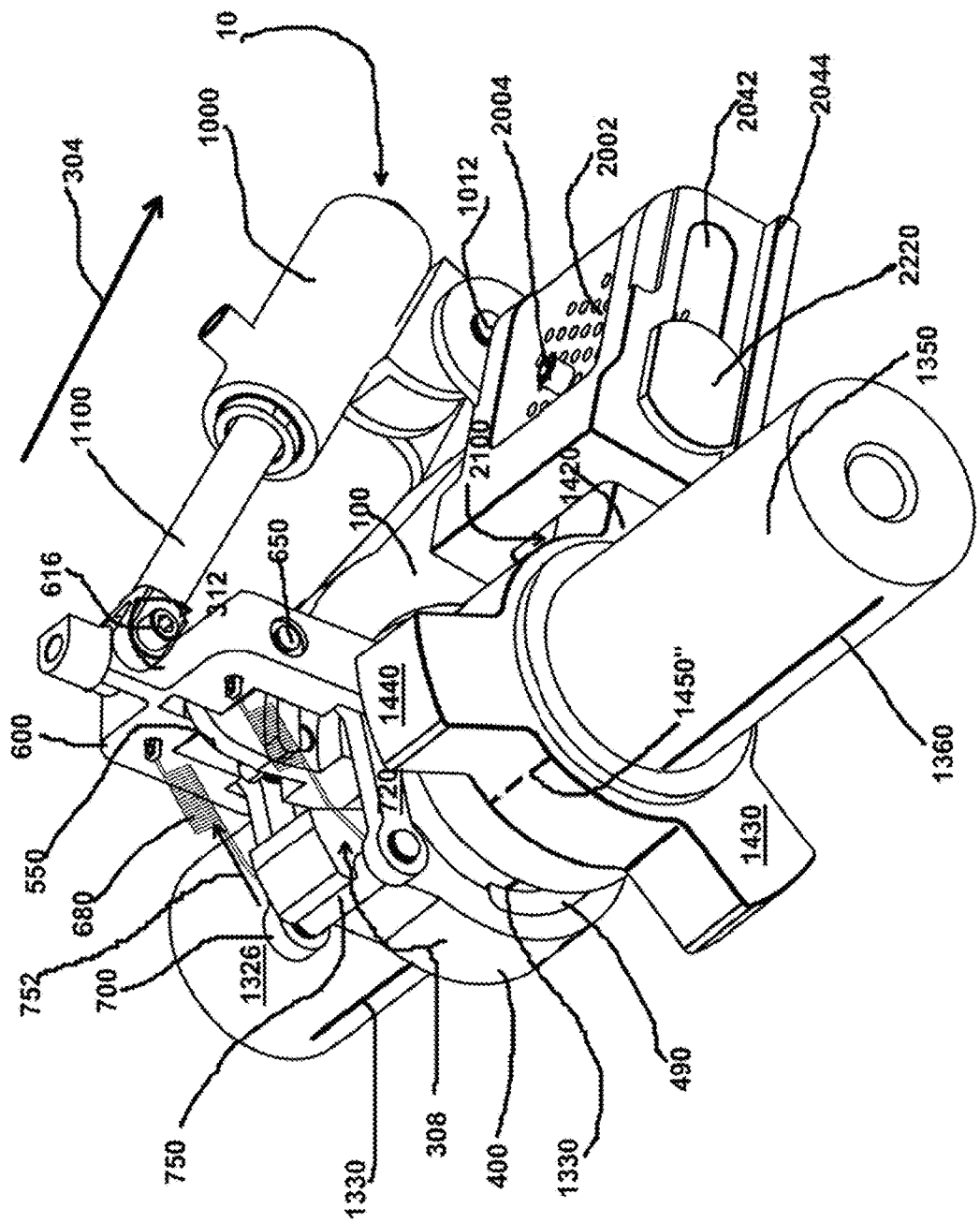
FIGS. 34 through 38 schematically illustrate various steps in the process of loosening the hammer union connection.

FIGS. 32 and 33 are schematic diagrams of the four bar linkage system for the squeezing clamp 390 shown respectively in expanded (FIG. 32) and squeezed or compressed (FIG. 33) states. For purposes of clarity first 400 and second 500 are shown as straight lines (instead of their actual arcuate shapes). In FIG. 32 first arcuate section 400 and second arcuate section 500 links make an angle 396. In FIG. 33, this angle is reduced to 396' as pivot point 612 of fulcrum lever 600 is moved in the direction of arrow 312 (by extension of rod 1100) from FIG. 32 to FIG. 33. Similarly, retraction of rod 1100 moves pivot point 612 of fulcrum lever 612 in the opposite direction of arrow 312' in FIG. 33 to its position shown in FIG. 32. Moving pivot point 612 from its position in FIG. 32 to its position in FIG. 33 causes first and second arcuate sections 400,500 to close in (Reducing angle 396 to angle 396'). On the other hand, moving pivot point 612 from its position shown in FIG. 33 to its position shown in FIG. 32 causes first and second arcuate sections 400,500 to open in (enlarging angle 396' to angle 396). Such reduction and enlargement of angle 396 allows clamping assembly 395 to frictional clamp on joint 1320 while body 100 and lug socket 2000 turn hammer union wing nut 1400 (during extension of rod 1100), and also unclamp and slip over surface 1326 of joint 1320 (during retraction of rod 1100) thereby allowing clamping head 390 to ratchet back from an extended to non-extended position without having to be removed from tubular/pipe 1300 and/or removing lug socket from lug 1420 (and wing nut 1400) being turned, and without having to open up clamp head 390 (i.e., clamp head 390 remains a closed head during both extension and retraction of rod 1100).

In one embodiment, during an extension stroke of rod 1100, interior space 395 of clamp head 390 will attempt to contract in size. Such contraction can be caused by fulcrum lever 600 pulling on links 700,720 (such as in the direction of arrow 316) which tends to cause first link 400 to rotate relative to second link 500 in the direction of arrow 324 about pivot point 424,524.

In one embodiment, during a retraction stroke of rod 1100, interior space 395 of drive clamp head 390 will attempt to expand in size. Such expansion can be caused by fulcrum lever 600 pushing links 700,720 (such as in the opposite direction of arrow 316) which tends to cause first arcuate section 400 to rotate relative to second arcuate section 500 in the opposite direction of arrow 324 about pivot point 424,524.

Relative Rotation of First And Second Arcuate Sections In Retraction Versus Extension Modes In one embodiment, during a retraction stroke of rod 1100, the four bar linkage mechanism of clamp head 390 (formed by fulcrum 600, links 700,720; first arcuate section 400, and second arcuate section 500 form a four bar linkage system) will enter an expanding state where rotation of first arcuate section 400 relative to second arcuate section 500 about pivot point 424,524 occurs in the opposite direction of arrow 324. In one embodiment such relative expanding relative rotation between first arcuate section 400 and second arcuate section 500 is limited/restricted to a maximum extent. In one embodiment during a retraction stroke of rod 1100, the maximum amount of relative rotation between first arcuate section 400 and second arcuate section 500 in degrees is about 1, 2, 3, 4, 5, 6, 7, 8, 9, 10, 12, 14, 15, 16, 18, 20, 22, 24, 25, 26, 28, 30, 32, 34, 35, 36, 37, 38, 39, 40, 42, 44, 45, 46, 48, 50, 52, 56, 58, and 60 degrees. In various embodiments the maximum amount of relative rotation is between about any two of the above specified relative degree measurements. In one embodiment before reaching any maximum amount of relative rotation between first arcuate section 400 and second arcuate section 500 (with respect to the four bar link system), the increasing reaction forces arising from fulcrum lever 600 attempting to expand first arcuate section 400 relative to second arcuate section 500 increase to such an extent that frictional forces between track 570 and arcuate slot 130 (along with possible frictional forces between first arcuate section 400 and/or second arcuate section 500 relative to item 1300) are overcome allowing clamp head 390 to rotate/ratchet back into an initial starting drive position to be ready for the next extension stroke of rod 1100.

Relative Rotation of Lever Fulcrum to Clamp Head In Retraction versus Extension Modes In one embodiment, during a retraction stroke of rod 1100, the four bar linkage mechanism of clamp head 390 (formed by fulcrum 600, links 700,720; first arcuate section 400, and second arcuate section 500 form a four bar linkage system) will cause lever fulcrum 600 to rotate relative to clamp head (and relative to pivot arm 550 of second arcuate section 500) causing interior area 395 of clamp head to enter an expanding state, and during extension of rod 1100 lever fulcrum 600 will rotate in the opposite direction (compared to retraction of rod 1100) causing clamp head 390 to enter a contracted state. In one embodiment the maximum sweep (relative to clamp head 390) of lever fulcrum 600 during retraction and extension strokes of rod 1100 in degrees is about 1, 2, 3, 4, 5, 6, 7, 8, 9, 10, 12, 14, 15, 16, 18, 20, 22, 24, 25, 26, 28, 30, 32, 34, 35, 36, 37, 38, 39, 40, 42, 44, 45, 46, 48, 50, 52, 56, 58, and 60 degrees. In various embodiments the maximum amount of relative rotation of lever fulcrum 600 is between about any two of the above specified relative degree measurements.

Relative Sizes of Interior Space In Retraction versus Extension Modes

In one embodiment, during a retraction stroke of rod 1100, the four bar linkage mechanism of clamp head 390 (formed by fulcrum 600, links 700,720; first arcuate section 400, and second arcuate section 500 form a four bar linkage system) will enter an expanding state where rotation of first arcuate section 400 relative to second arcuate section 500 about pivot point 424,524 occurs in the opposite direction of arrow 324 and increases the interior space 395 of clamp head 390 compared to the size of the interior space 395 during a retraction stroke. In one embodiment such relative expansion of interior space 395 is limited/restricted to a maximum extent. In one embodiment during a retraction stroke of rod 1100, the maximum amount of relative expansion of interior space during an expansion stroke in percent area (compared to the cross sectional area of interior space's 395 size during extension stroke of rod 1100) is about 1, 2, 3, 4, 5, 6, 7, 8, 9, 10, 12, 14, 15, 16, 18, 20, 22, 24, 25, 26, 28, 30, 32, 34, and 35 percent. In various embodiments the maximum amount of relative expansion is between about any two of the above specified relative percentages. In one embodiment before reaching any maximum amount of relative rotation between first arcuate section 400 and second arcuate section 500 (with respect to the four bar link system), the increasing reaction forces arising from fulcrum lever 600 attempting to expand first arcuate section 400 relative to second arcuate section 500 increase to such an extent that frictional forces between track 570 and arcuate slot 130 (along with possible frictional forces between first arcuate section 400 and/or second arcuate section 500 relative to item 1300) are overcome allowing clamp head 390 to reset by rotating/ratcheting back into an initial starting drive position to be ready for the next extension stroke of rod 1100.

In one embodiment the cross sectional area of the interior space 395 can be defined by the area circumscribed by the interior portions of the first 400 and second 500 sections of the clamp head 390. Because there may be a gap between the ends 410,510 of the interior portions of first 400 and second 500 sections of the clamp head 390 (such as when in an expanded state), the area circumscribed can be determined by extrapolating the end 410 of the interior portion of the first arcuate section 400 of the clamp head 390 onto the end 500 of the interior portion of the second arcuate section 500 of the clamp head 390. Such extrapolation can be by a method of curve fitting such as using standard curve fitting (e.g., the best fit curve fit 396) considering the shape of the interior portion of the first arcuate section 400 of the clamp head 390 and the shape of the interior portion of the second arcuate section 500 of clamp head 390. Alternatively a straight line 397 can be drawn between the ends of the interior portion of the first 400 and second 500 sections of clamp head 390.

Changes In Contact Area Between Clamp head and Item To Be Tightened Or Loosened During Extension And Retraction In one embodiment during an extension stroke of rod 1100 clamp head 390 has a maximum extension stroke area of contact with item 1300, and during a retraction stroke of rod 1100 clamp head 390 has a minimum retraction stroke area of contact with item 1300. In one embodiment the maximum extension stroke area of contact is greater than the minimum retraction stroke area of contact. In various embodiments the extension stroke maximum area of contract is at least 1.1, 1.2, 1.3, 1.4, 1.5, 1.75, 2, 2.25, 2.5, 2.75, 3, 4, 5, 10, 15, 20, 25, 30, 35, 40, 45, and 50 times the retraction stroke minimum area of contact. In various embodiments the ratio of these to areas is between any two of the above specified ratio measurements.

Frictionally Enhancing Elements

Figure 19:
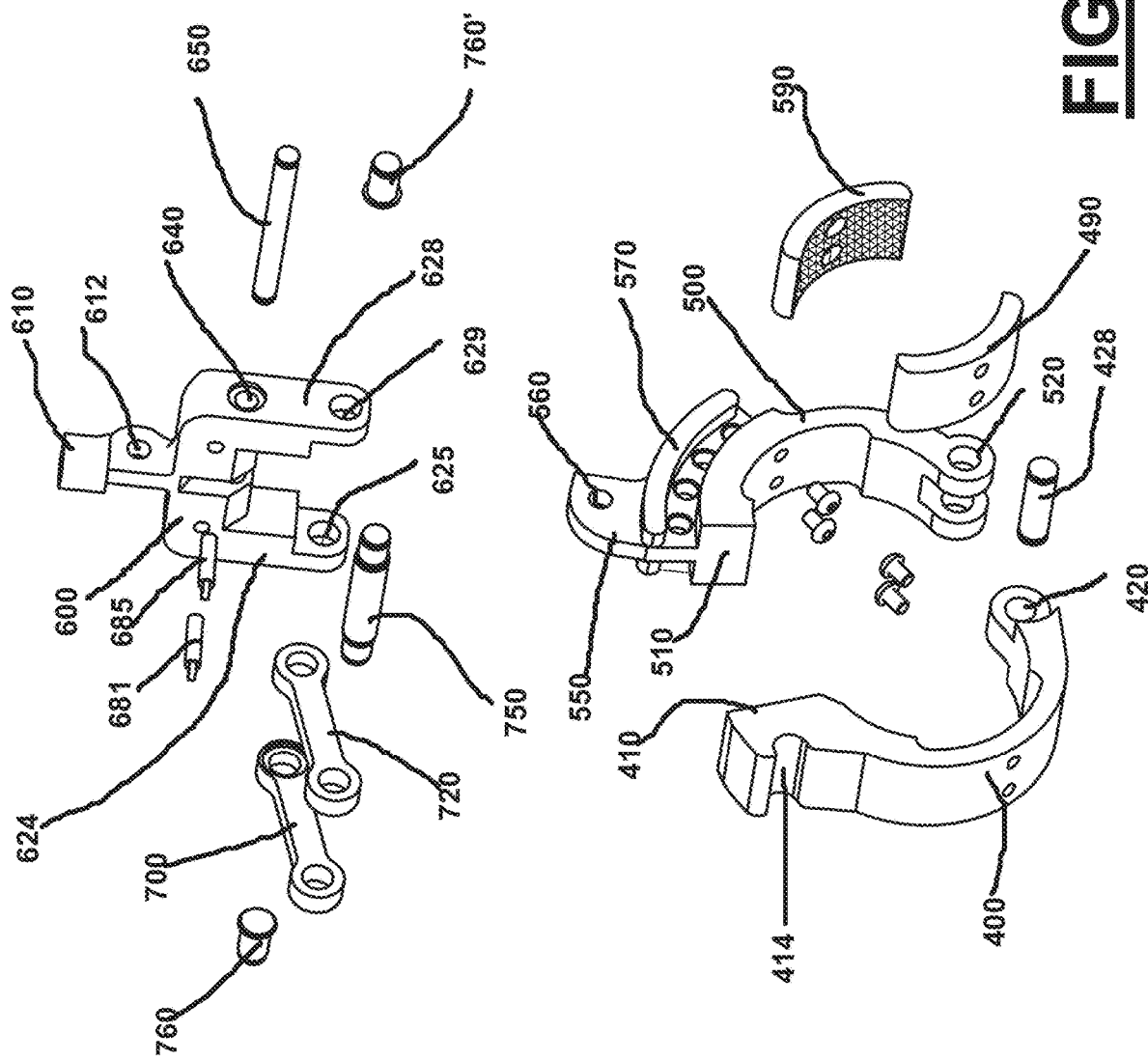
FIG. 19 is an exploded view of various components of the tool's frictional clamping head.

As shown in FIG. 19, in one embodiment first arcuate section 400 and/or second arcuate section 500 can include a frictionally enhancing elements 490, 590. Frictionally enhancing elements 490, 590 can be constructed of materials having high coefficients of frictions (such as knurled surfaces and/or rubber) and can be relatively flexible compared to the materials from which first 400 and second 500 sections are constructed. It has been found that during an initial extension stroke of rod 1100 clamp head 390 may start to slide over joint 1320 before lever fulcrum 600 can cause clamp head 390 to squeeze against the surface 1326 of joint 1320 enough to create large frictional forces between contracting clamp head 390 and joint 1320. In this case frictional enhancing members can be used to create initial frictional forces until fulcrum lever 600 can cause clamp head 390 to create greater frictional forces between plurality of gripping inserts 490, 590 and pipe 1300.

Plurality Of Differing Sized Frictional Squeezing Clamp Inserts And Frictional Squeezing Clamps In one embodiment a plurality of interchangeable gripping inserts 490, 490', 490", etc. can be provided for first acuate section 400, along with a plurality of interchangeable gripping inserts 590, 590', 590", etc. for second arcuate section 500. For example, inserts 490,590 can provide for gripping onto a pipe/tubular of a predefined first range of diameters, while gripping inserts 490',590' can provide for gripping onto a pipe/tubular of a predefined second range of diameters, while gripping inserts 490",590" can provide for gripping onto a pipe/tubular of a predefined third range of diameters—all with the same first and second arcuate sections 400,500. In various embodiments the first, second, and/or third predefined diameter ranges do not overlap, while in other embodiments they can overlap at least in a portion of the ranges. In various embodiments, the first, second, and third predefined diameter ranges can vary between 5, 10, 15, 20, 30, 40, 50, 75, 100, 125, 150, 200, 300, 400, and 500 percent. In various embodiments the variation can be a range between any to of the above specified percentages.

In one embodiment a plurality of interchangeable frictional gripping heads 390,390',390", etc. can be provided which each cooperate with the same body 100, the gripping heads providing for for gripping onto a pipe/tubular of a predefined first, second, and third diameters ranges. In various embodiments the first, second, and/or third predefined diameter ranges do not overlap, while in other embodiments they can overlap at least in a portion of the ranges. In various embodiments, the first, second, and third predefined diameter ranges can vary between 5, 10, 15, 20, 30, 40, 50, 75, 100, 125, 150, 200, 300, 400, and 500 percent. In various embodiments the variation can be a range between any to of the above specified percentages.

The following is a list of reference numerals:

| LIST FOR REFERENCE NUMERALS | |
|---|---|
| (Reference No.) | (Description) |
| 10 | improved torque wrench |
| 50 | base |
| 100 | wrench body |
| 102 | opening |
| 104 | opening |
| 106 | opening |
| 110 | first end |
| 120 | second end |
| 122 | opening |
| 130 | arcuate slot |
| 140 | top |
| 144 | bottom |
| 300 | squeezing substantially circular head portion |
| 304 | arrow |
| 308 | arrow |
| 310 | arrow |
| 312 | arrow |
| 316 | arrow |
| 320 | arrow |
| 324 | arrow |
| 328 | arrows |
| 330 | arrows |
| 340 | arrow |
| 342 | arrow |
| 390 | clamp head |
| 395 | interior space |
| 396 | first curve |
| 397 | line |
| 400 | first arcuate section |
| 410 | first end |
| 414 | arcuate flange |
| 420 | second end |
| 424 | opening |
| 428 | pin |
| 430 | friction element |
| 450 | handle |
| 470 | fastener |
| 490 | plurality of gripping inserts |
| 500 | second arcuate section |
| 510 | first end |
| 520 | second end |
| 524 | opening |
| 530 | friction element |
| 550 | arm member |
| 560 | opening |
| 570 | track |
| 574 | recessed area |
| 590 | gripping insert(s) |
| 600 | fulcrum lever |
| 610 | first end |
| 612 | opening |
| 616 | pin |
| 620 | second end |
| 624 | prong |
| 625 | opening |
| 628 | prong |
| 629 | opening |
| 640 | opening |
| 650 | pin |
| 680 | biasing member |
| 681 | connection |
| 682 | arrow |
| 684 | biasing member |
| 685 | connection |
| 700 | first link |
| 704 | first end |
| 708 | second end |
| 720 | second link |
| 724 | first end |
| 728 | second end |
| 750 | pin |
| 760 | fastener |

-continued

LIST FOR REFERENCE NUMERALS

| (Reference No.) | (Description) |
|---|---|
| 760' | fastener |
| 1000 | hydraulic cylinder |
| 1010 | first end |
| 1012 | pin |
| 1014 | opening |
| 1020 | second end |
| 1030 | fastener |
| 1100 | rod |
| 1110 | first end |
| 1120 | second end |
| 1124 | arrows |
| 1200 | hydraulic line |
| 1210 | hydraulic line |
| 1300 | pipe |
| 1320 | first section |
| 1322 | threads |
| 1326 | exterior surface |
| 1330 | positioning line |
| 1350 | second section |
| 1360 | positioning line |
| 1390 | hammer |
| 1392 | person |
| 1400 | hammer union |
| 1402 | threads |
| 1406 | arrow |
| 1410 | plurality of lugs |
| 1420 | first lug |
| 1430 | second lug |
| 1440 | third lug |
| 1450 | positioning line |
| 2000 | drive member |
| 2002 | plurality of openings |
| 2004 | locking pin |
| 2005 | opening |
| 2006 | plurality of openings |
| 2010 | first end |
| 2020 | second end |
| 2030 | first side |
| 2032 | slot |
| 2034 | rib |
| 2040 | second side |
| 2042 | slot |
| 2044 | rib |
| 2050 | arrow |
| 2060 | top |
| 2064 | bottom |
| 2100 | socket opening |
| 2110 | fitting |
| 2200 | bolt |
| 2210 | first half |
| 2220 | second half |

All measurements disclosed herein are at standard temperature and pressure, at sea level on Earth, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

What is claimed is:

1. A method for tightening or loosening a wing nut having a plurality of lugs of a hammer union connection between first and second joints of pipe comprising the steps of:

(a) providing a fluid powered hammer union torque wrench including:
(1) a body and a frictionally squeezing clamp connected to the body, the frictionally squeezing clamp having an opening with squeezing and relaxed states;
(2) a lug socket connected to the body;
(3) a single fluid cylinder and single rod operatively connecting the frictionally squeezing clamp to the body, the single rod being extendable and retractable relative to the single fluid cylinder;
(4) the extension and retraction of the single rod relative to the single fluid cylinder respectively causing the frictionally squeezing clamp to enter the squeezing and relaxed states, (b) placing the frictionally squeezing clamp around the first joint of pipe, connecting the lug socket to at least one of the lugs of the plurality of lugs;

(c) causing extension of the single rod thereby causing both: (i) the frictionally squeezing clamp to enter into the squeezing state wherein the opening is reduced to create frictional forces between the frictionally squeezing clamp and the first joint of pipe such that the frictionally squeezing clamp and the first joint of pipe are locked relative to each other, and (ii) relative rotation between the wing nut and the first joint of pipe; and (d) after step "c", causing retraction of the single rod thereby causing both: (i) relative rotation between the lug socket and the clamp, and (ii) the frictionally squeezing clamp to enter into the relaxed state thereby reducing frictional forces between the frictionally squeezing clamp and the first joint of pipe thereby allowing relative rotation between the frictionally squeezing clamp and the first joint of pipe while the wing nut remains rotationally static relative to the first joint of pipe, and (e) repeating steps "c" and "d" until the hammer union connection is selectively tightened or loosened.

2. The method of claim 1, wherein during steps "c" and "d" the frictional squeezing clamp forms a closed loop around the first joint of pipe and the lug socket remains detachably connected to one of the lugs of the wing nut.

3. The method of claim 1, wherein during step "c" the frictional squeezing clamp remains rotationally static relative to the first joint of pipe.

4. The method of claim 1, wherein during step "c" the frictional squeezing clamp rotates relative to the second joint of pipe.

5. The method of claim 1, wherein step "e" is performed until the torque of the tightened hammer union connection reaches a predefined tightening torque.

6. The method of claim 1, wherein during step "c" the amount of squeezing on the frictional squeezing clamp both increases and decreases during turning of the wing nut for tightening the hammer union connection.

7. The method of claim 6, wherein during the initial portion of a turn of the wing nut the squeezing increases and at the end portion of a turn the squeezing decreases.

8. The method of claim 1, wherein the frictional squeezing clamp includes a quick lock/quick unlock system, and the relative position between the squeezing frictional clamp and the first joint of pipe can be changed by placing the quick lock/quick unlock system in an unlocked state.

9. The method of claim 8, wherein the relative position between the squeezing frictional clamp and the first joint of pipe can also be changed when the quick lock/quick unlock system is in a locked state.

10. The method of claim 1, wherein in step "a", the frictional squeezing clamp includes first and second arcuate sections, each arcuate section including first and second ends, the first ends of the first and second arcuate sections being pivotally connected to each other and the second ends of the first and second arcuate sections being detachably connected to each other with a quick lock/quick unlocking system detachably connecting the second ends of the first and second arcuate sections.

11. The method of claim 10, wherein the quick lock/quick unlocking system includes a biasing member which tends to pull closer the second ends of the first and second arcuate sections.

12. The method of claim 11, wherein the quick lock/quick unlocking system can be placed in an unlocked state by stretching the biasing member.

13. The method of claim 10, wherein the frictionally squeezing clamp includes a set of interchangeable jaws detachably connectable to the frictionally squeezing clamp, the different sets of interchangeable jaws being for detachably connecting the squeezing clamp to different diameter joints of pipe, wherein the same first and second squeezing arcuate sections can be used to detachably connect to different diameters of joints of pipe by changing out a first set of interchangeable jaws with a second set of interchangeable jaws on the first and second arcuate clamp sections.

14. The method of claim 1, wherein in step "a", the lug socket includes a recessed area for receiving a hammer lug, the lug socket being detachably connectable to the body.

15. The method of claim 14, wherein the frictionally squeezing clamp is circular with a center point, and the lug socket is linearly slidably adjustable away and towards the center point.

16. The method of claim 14, wherein the lug socket includes a reinforcement flange, and the reinforcement flange is slidable linearly relative to the frictionally squeezing clamp.

17. The method of claim 14, wherein the lug socket includes a plurality of openings for receiving at least one positioning locking bar, wherein the at least one locking bar restricts relative linear movement of the lug socket with respect to the frictionally squeezing clamp.

18. The method of claim 1, wherein a dual clevis operatively connects the single fluid cylinder and single rod and the frictionally squeezing clamp.

19. The method of claim 1, wherein during step "c" no hammering is performed on any lug of the wing nut.

20. The method of claim 1, wherein during steps "c" and "d" no hammering is performed on any lug of the wing nut.

* * * * *